Aug. 29, 1944. S. J. FINN 2,356,756
MACHINE FOR PRESSING SOLES UPON SHOE BOTTOMS
Filed Sept. 4, 1942 13 Sheets-Sheet 1

Aug. 29, 1944. S. J. FINN 2,356,756
MACHINE FOR PRESSING SOLES UPON SHOE BOTTOMS
Filed Sept. 4, 1942 13 Sheets-Sheet 2

Aug. 29, 1944. S. J. FINN 2,356,756
MACHINE FOR PRESSING SOLES UPON SHOE BOTTOMS
Filed Sept. 4, 1942 13 Sheets-Sheet 4

INVENTOR

Aug. 29, 1944.  S. J. FINN  2,356,756
MACHINE FOR PRESSING SOLES UPON SHOE BOTTOMS
Filed Sept. 4, 1942  13 Sheets-Sheet 5

INVENTOR:
Sidney J. Finn
By his Attorney

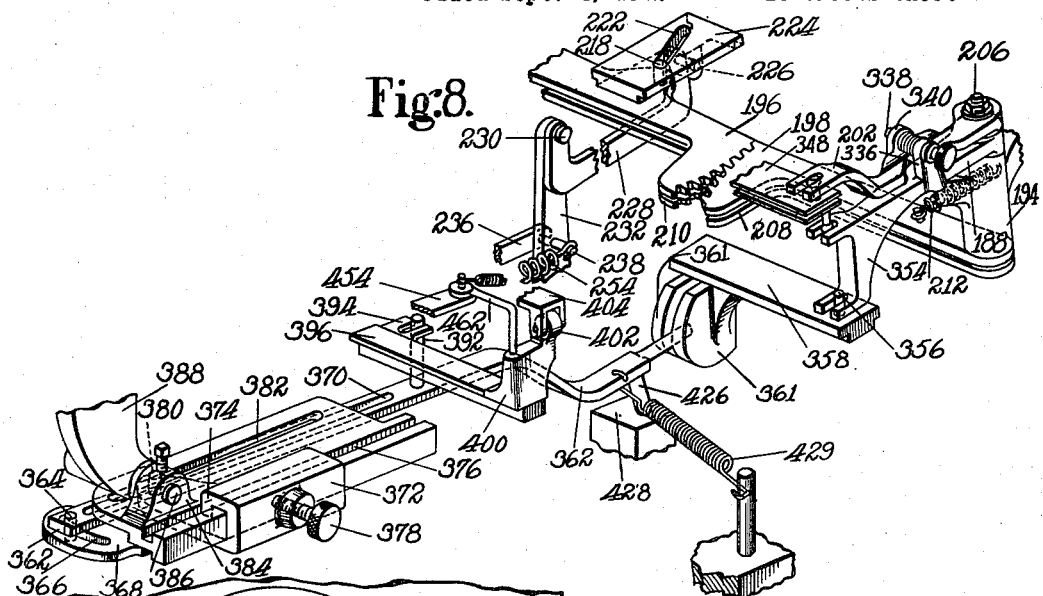
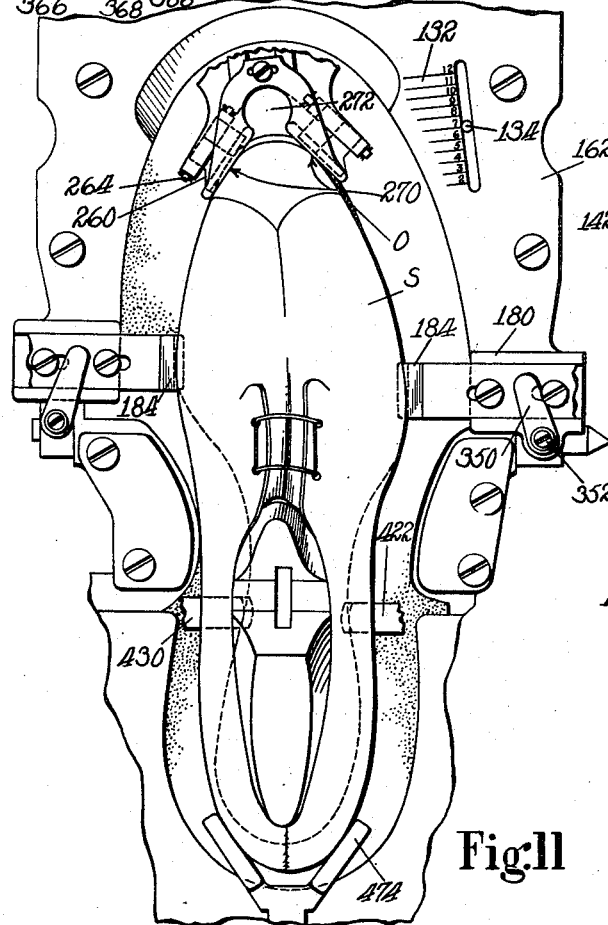
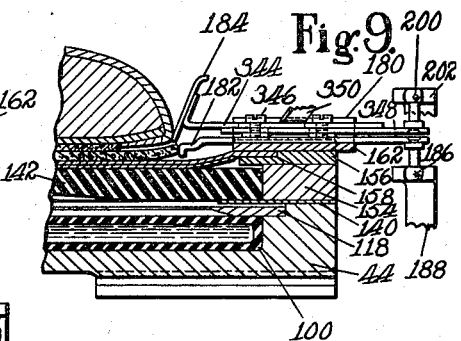
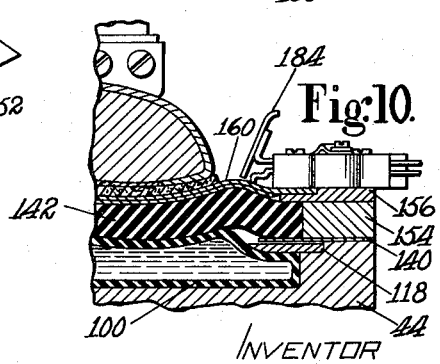

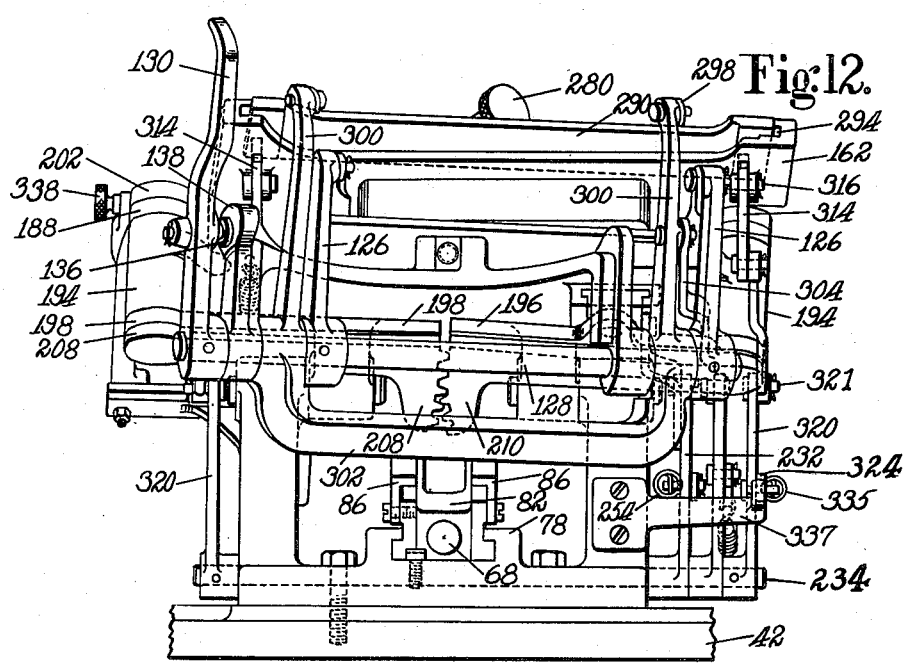
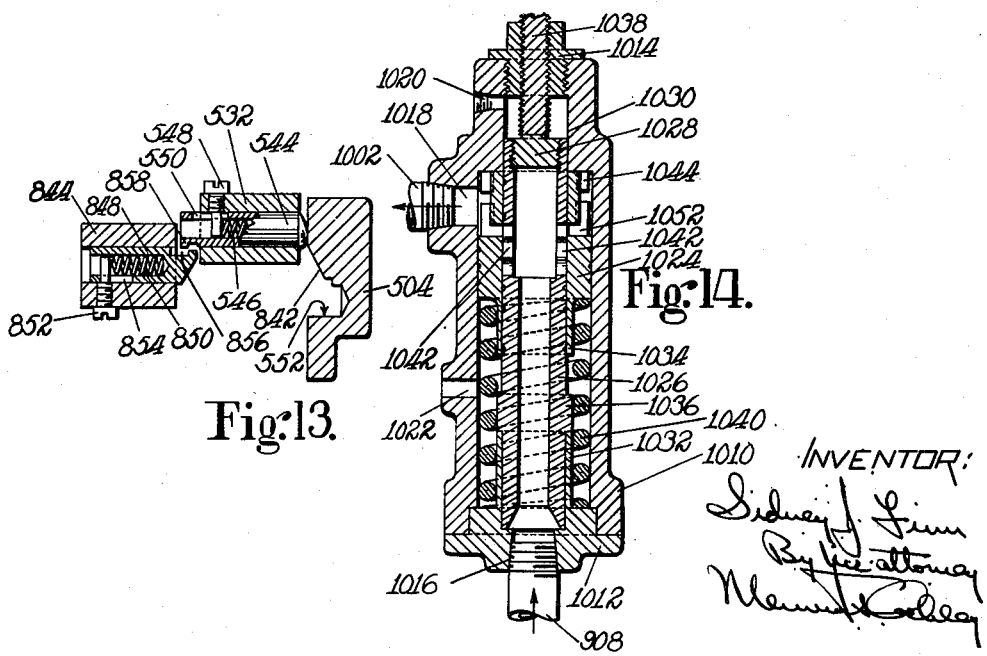

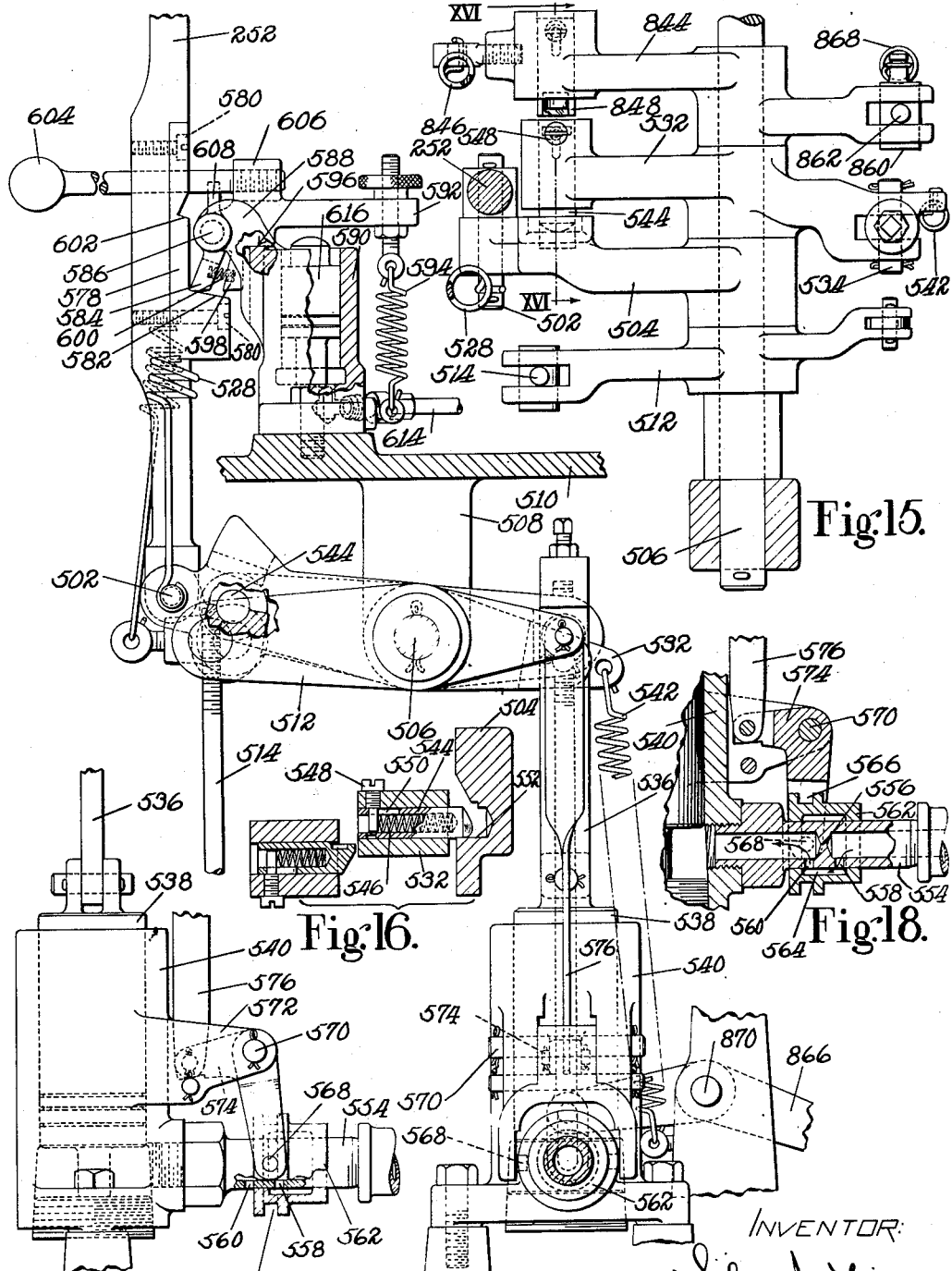

Aug. 29, 1944.  S. J. FINN  2,356,756
MACHINE FOR PRESSING SOLES UPON SHOE BOTTOMS
Filed Sept. 4, 1942  13 Sheets-Sheet 10

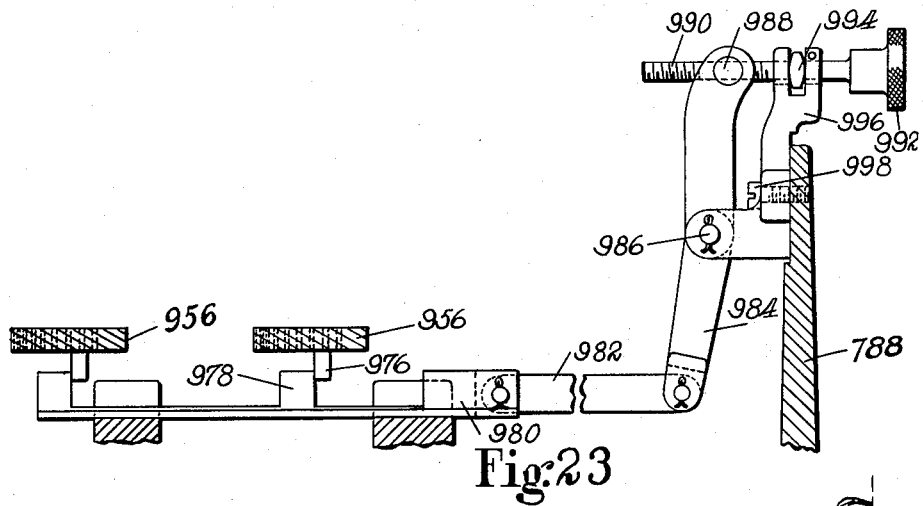
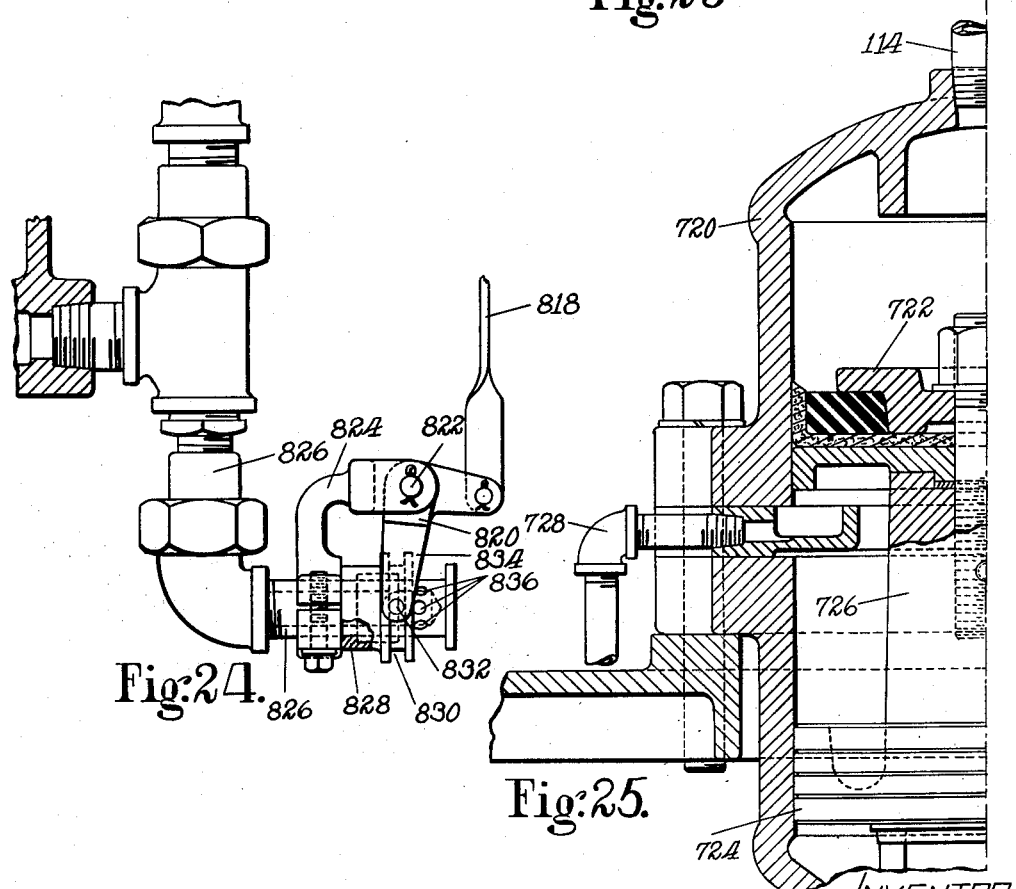

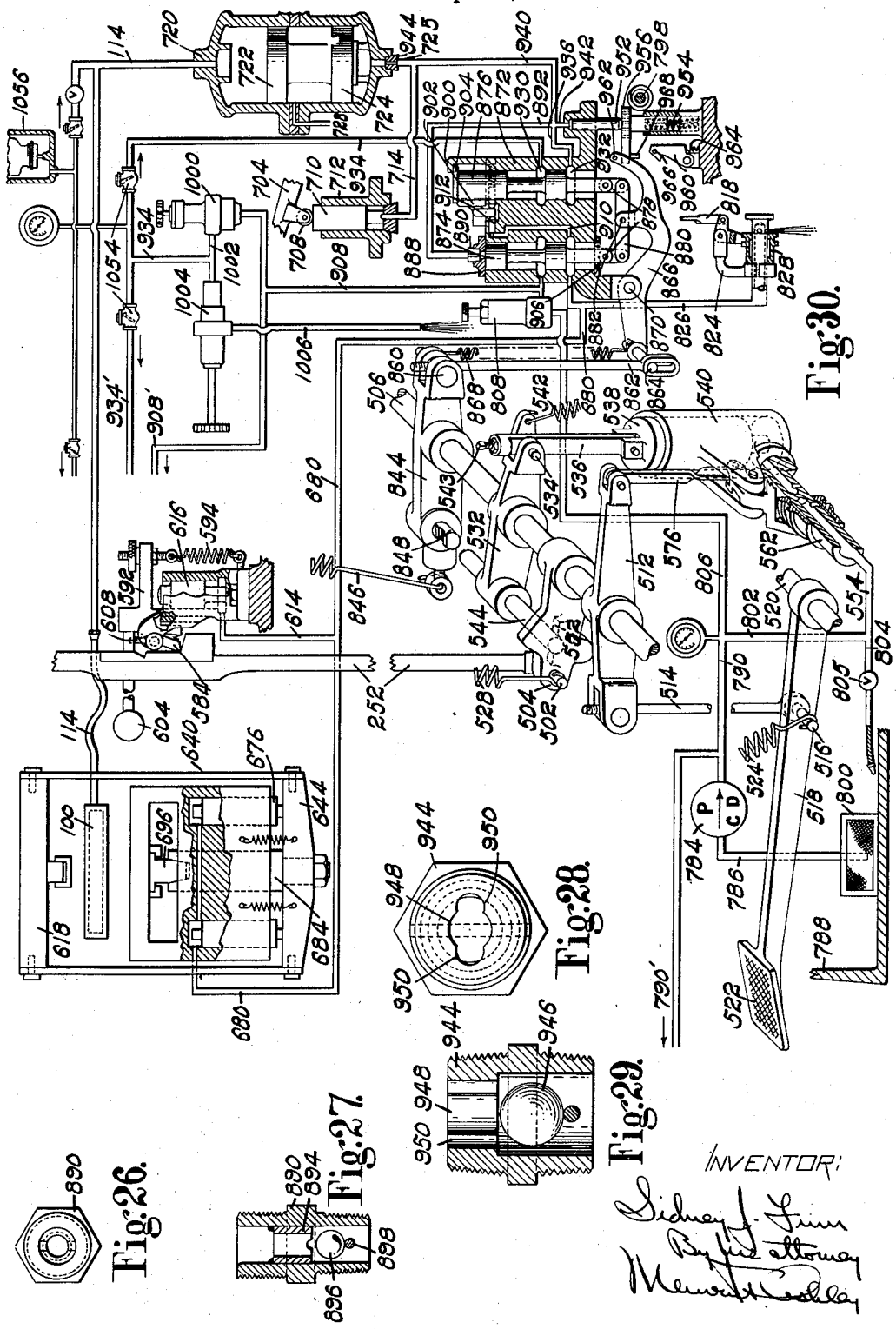

Aug. 29, 1944.　　　　S. J. FINN　　　　2,356,756
MACHINE FOR PRESSING SOLES UPON SHOE BOTTOMS
Filed Sept. 4, 1942　　　13 Sheets-Sheet 13

INVENTOR:
Sidney J. Finn
By his attorney

Patented Aug. 29, 1944

2,356,756

UNITED STATES PATENT OFFICE 2,356,756

MACHINE FOR PRESSING SOLES UPON SHOE BOTTOMS

Sidney J. Finn, Beverly, Mass., assignor to United Shoe Machinery Corporation, Flemington, N. J., a corporation of New Jersey Application September 4, 1942, Serial No. 457,272

106 Claims. (Cl. 12—33)

This invention relates to machines for pressing soles upon shoe bottoms and is adapted for operations such as sole laying and cement sole attaching.

Objects of the invention are to provide a machine which, while sacrificing none of the advantages provided by the machine of my prior Letters Patent of the United States No. 2,301,205, granted November 10, 1942, will be more effective and convenient in operation.

Further objects of the invention are to provide shoe and sole-locating mechanisms whereby a sole, irrespectively of size or style, may be located in predetermined relation to a sole-pressing pad, and a shoe may be definitely located with respect to the sole.

The illustrated machine comprises a sole-pressing pad provided with adjustments whereby its surface may be made to correspond to the longitudinal curvature of the shoe bottom and ball line gages connected together for equal and opposite movement, said gages being arranged to engage a sole of any size substantially at the ball line and to locate said sole centrally of the pad on which the sole is located. Adjacent to and above the sole gages are shoe gages which also are arranged for equal and opposite movement and are operated to locate a shoe with respect to the sole held by the sole gages. Preferably a yielding device is provided in the mechanism for operating the shoe gages to permit slight separation of the gages when positioning a shoe between them if they are too close together for that particular shoe. A V-gage for the toe end of the shoe is arranged to be moved toward the sole held by the ball gages and is arranged for lateral floating movement whereby it is able to find the toe end of the sole, means being provided to lock the sole gage in that position. Adjustably carried by the sole-toe gage is a shoe gage, the shoe gage being adapted properly to locate a shoe with respect to the sole which is in contact with the sole gage.

The illustrated machine is provided with sole gages which engage the sole in the vicinity of the ends of the breast line, preferably somewhat forwardly thereof, that is, at points where the width of the average sole is approximately one-half as wide as at the ball line. The breast line gage at the outer end of the breast line is so connected with the ball line sole gages that the breast line gage will be moved about half the distance which the corresponding ball line gage moves, provision being made for adjusting this ratio to adapt the mechanism for various styles of soles.

The breast-line gage for the opposite or inner end of the breast line is connected with the gage at the outer end of the breast line for equal and opposite movement, provision being made for yielding of that gage should it contact too soon at the inner side of the sole.

A V-shaped gage for the rear end of the shoe, which is arranged for movement toward and from the shoe in the direction of the longitudinal median line of the rear part of the shoe, is provided with means for locking it in engagement with the shoe, this gage being also arranged for circular adjustment about a center substantially at the intersection of the logitudinal median line of the rear part with the longitudinal median line of the forepart.

After the shoe and sole are located with respect to each other, the shoe is pressed upon the pad. For this purpose the illustrated machine comprises novel hydraulic mechanism for applying pressure directly to the shoe to force it against the pad and means, herein illustrated as a wedge, for locking the shoe under pressure.

Still further to insure uniform sole-attaching pressure between the shoe and sole, an inflatable bag is provided beneath the pad in which a fluid, such as water, is forced to cause uniform pressure to be applied to the entire shoe bottom. In the illustrated machine a single operating treadle is provided the first depression of which causes the gages to be moved to operative position and the second depression of which causes the gages to be released, a valve mechanism set to apply pressure to the shoe, the locking wedge operated to maintain such pressure, the pad beneath the shoe inflated, and, after a predetermined time, the valve mechanism operated to cause deflation of the bag, release of pressure on the shoe and withdrawal of the wedge.

As illustrated, pressure is applied to the shoe by toe and heel abutments which are arranged to swing into and out of position over the shoe. To prevent accidental operation of these abutments when they are not in position over the shoe, means is provided to prevent operation of the abutments by fluid pressure unless they are in position over the shoe and to prevent full operation thereof even if they are positioned over the pad with no shoe between them and the pad.

These and other features of the invention will appear more fully from the following description when read in connection with the accompanying drawings and will be pointed out in the appended claims.

In the drawings,

Fig. 8 is a skeletonized view showing the mechanism for operating the gages;

Fig. 9 is a view showing the shoe and pad box in section and the shoe and sole gages in elevation prior to the application of pressure to the shoe;

Fig. 10 is a similar view after the pressure has been applied to the shoe and the pad inflated;

Fig. 11 is a plan view of a shoe and sole on the pad box with the shoe and sole gages in operative position;

Fig. 12 is a rear view of the pad box showing the gage-operating mechanism and means for adjusting the mask plate;

Fig. 13 is a sectional detail similar to Fig. 16 with the parts in a different position;

Fig. 14 is a sectional view of the pressure-regulating valve with which the machine may be provided;

Fig. 15 is a plan view of various levers the operation of which is under control of the treadle;

Fig. 16 is a sectional view taken on the line XVI—XVI of Fig. 15;

Fig. 17 is an elevation, partly in section, of the treadle-operated sleeve valve in normal position;

Fig. 18 is a sectional view of the valve shown in Fig. 17 when in operating position;

Fig. 19 is an elevation, partly in section, showing the fluid-operated means for causing movement of the gages into operative position, locking them in that position and releasing them;

Fig. 23 is a detail of the means for adjusting the timing mechanism.

Fig. 24 is an elevation of the spill-over valve with which the machine is provided;

Fig. 25 is a sectional view of the cylinder and double piston utilized to cause water to be forced into the pad by oil pressure;

Figs. 26 and 27 are, respectively, a plan and a section of a metering valve for controlling the operation of one of the slide valves;

Figs. 28 and 29 are, respectively, a plan and a section of a metering valve for controlling operation of a piston;

Fig. 30 is a diagrammatic view illustrating the various fluid-operated devices with which the machine is provided and the means for controlling their operation in proper sequence;

Figure 1:
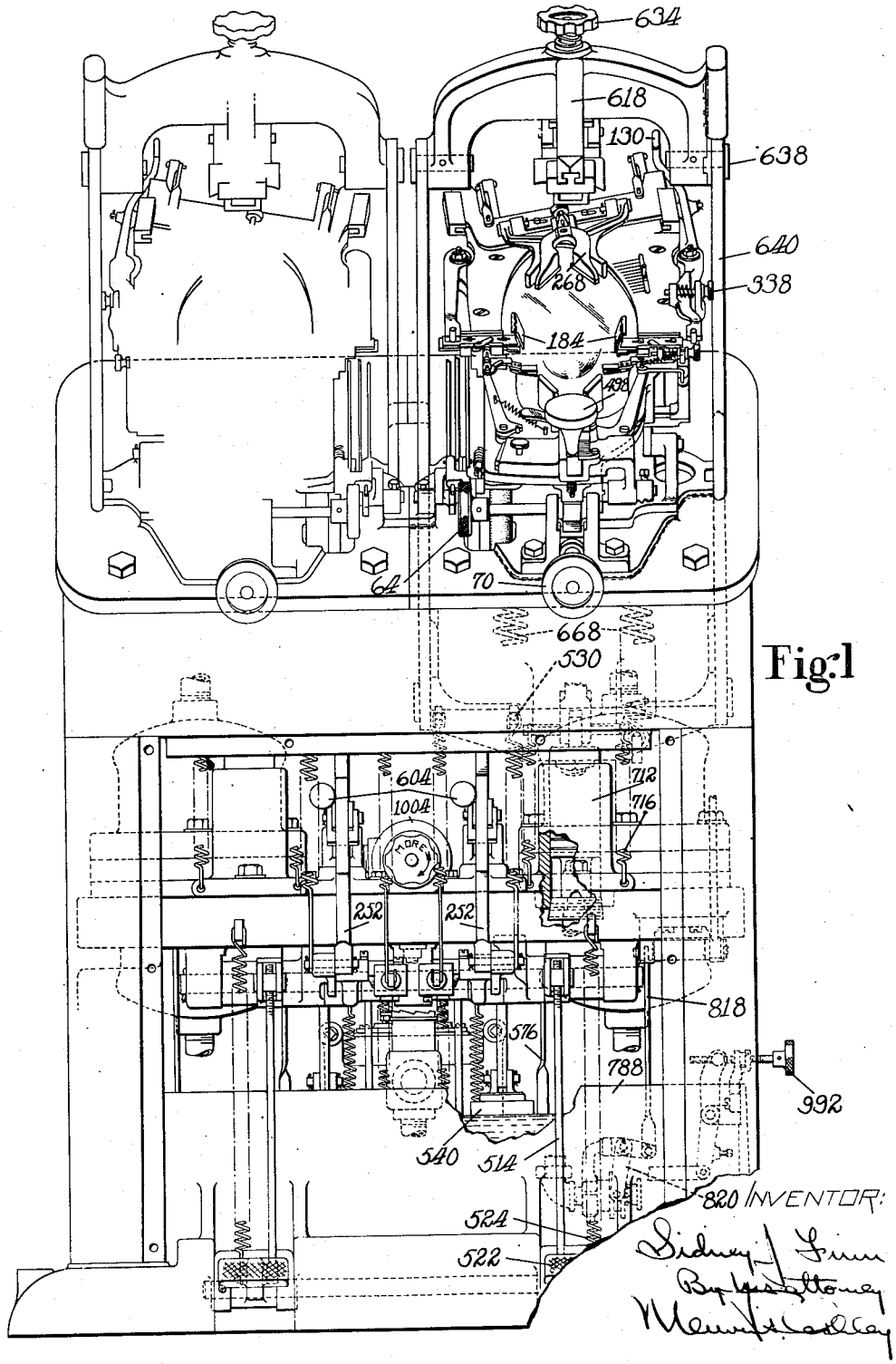
Fig. 1 is a view in front elevation of a machine in which the invention is embodied, with the front cover plate removed from the base to show more clearly the construction thereof.

The illustrated machine is organized to be operated by hydraulic pressure, that is, by oil pressure, and, aside from the handling of the sole and shoe, movement of the pressure-applying abutments over the shoe and the manipulation of a single treadle, is automatic. The first depression of the treadle causes the shoe and sole gages to be operated to bring them into contact with a sole placed on the pad and to locate the sole centrally relatively to the pad, the shoe gages then being in position properly to locate a shoe which is placed on the sole. Upon the second depression of the treadle, pressure is applied to force the shoe down against the pad and the gages are released. Next, a lower pressure is employed to operate a wedge to maintain the pressure applied to the shoe, to force water into the inflatable pad under the shoe, to lock the pressure-controlling valve mechanism in operative position and to set in operation a timing mechanism whereby, after a predetermined time, the lock is released, permitting the parts to be restored to initial positions. As indicated in Fig. 1, the machine is preferably duplex, the right-hand side of the machine being arranged for operation on a right shoe and the left-hand side for operation on a left shoe. Since, however, the two sides of the machine are substantially identical except that some of the parts on one side of the machine are like mirror images of corresponding parts on the other side of the machine, the description will be confined to the right-hand side, it being understood that the other side is similar and similarly operated. The pad and the shoe and sole-locating mechanism will now be described.

Figure 2:
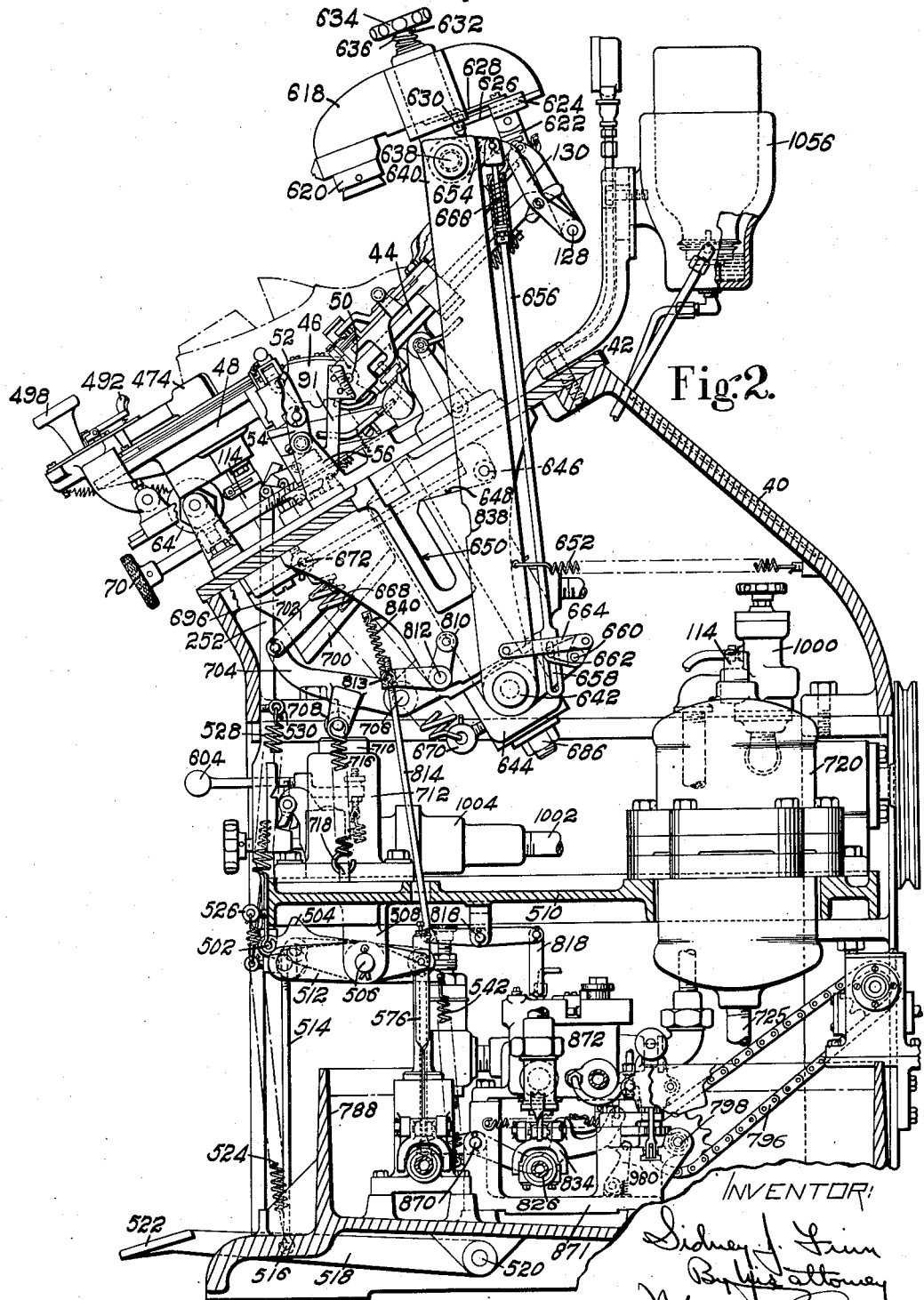
Fig. 2 is a view partly in side elevation and partly in section of the right-hand side of the machine shown in Fig. 1.
Figure 3:
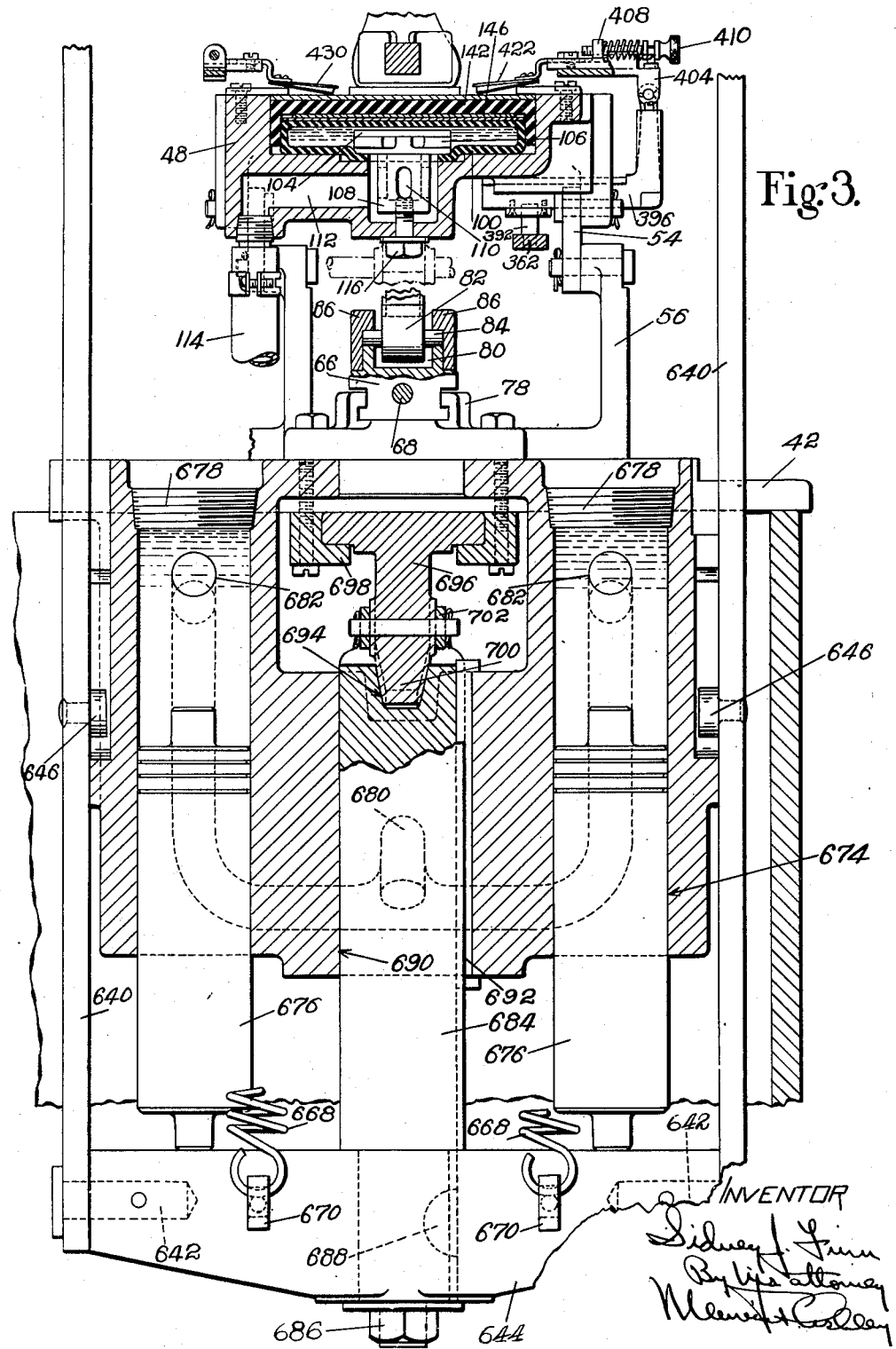
Fig. 3 is a sectional view, partly in elevation, illustrating the pad, the means for applying pressure to the shoe, and the wedge for locking the shoe under pressure.
Figures 5, 6:
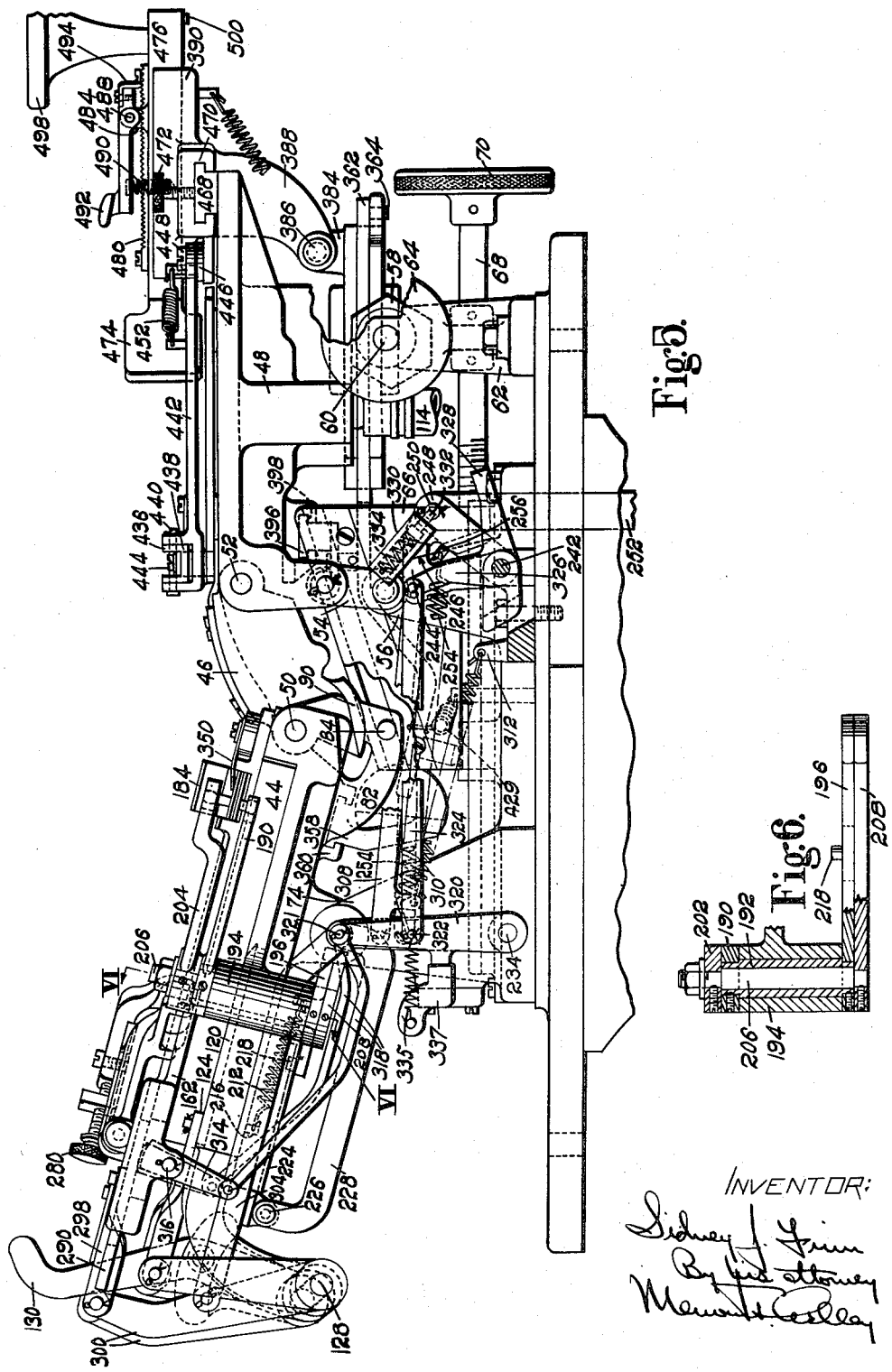
Fig. 5 is an elevation of the left-hand side of the right-hand pad box.
Fig. 6 is a sectional detail of parts shown in Fig. 5.

Referring to Figs. 2 and 5, the machine comprises a frame or casing 40 open at the top. Over the opening is a cover plate 42 arranged at about thirty degrees' inclination to the horizontal. The pad box comprises a forepart portion 44, a shank portion 46 and a heel portion 48, the forepart portion 44 being pivoted at 50 to the shank portion 46 and the shank portion being pivoted at 52 to the heel portion 48. The heel portion 48 is connected by links 54 to upstanding struts 56 at the end next to the shank portion 46 and near its opposite end is supported on a five-sided cam member 58 mounted eccentrically on a shaft 60 suported on struts 62. The shaft can be turned by a hand wheel 64 to vary the inclination of the rear part 48 with respect to the shank part 46. To vary the angular relation between the forepart 44 and the shank part 46 to adapt the longitudinal contour of the box to accommodate the bottom of shoes which are to have heels of different heights, a wedge 66 (Fig. 5) is provided which has threaded engagement with a rod 68 carrying a hand wheel 70 by the turning of which the wedge 66 may be moved longitudinally of the pad. The movement of the wedge 66 toward the toe end of the pad box will raise the pivot 50 relatively to the pivot 52 and flatten the contour of the pad box. To permit this, the forepart 44 of the pad box is pivoted on struts 74 for tipping movement by pins 76 shown in dotted lines in Fig. 7. The lower edge of the wedge 66, as shown in Fig. 3, is T-shaped and arranged to slide in guides 78 and at its upper edge is slotted lengthwise at 80.

to receive a lug 82 formed on the forepart portion 44 and provided with a pin 84 which rests on the top of the wedge. Gibs 86 are attached to the wedge at opposite sides thereof and have portions which overhang the pin to prevent upward movement thereof. The shank portion 46, as shown in Fig. 5, has a curved surface 90 arranged to engage a complemental surface on the upper face of the lug 82 to afford additional support for the shank portion independently of the pivot 50 from which as a center the curved surfaces are formed. By the described arrangement, adjustment of the wedge will positively move the pivot 50 up and down. To indicate the adjustment of the wedge, that is, the heightwise position of the pivot 50, the pivot is pointed and a fixed graduated scale 91 (Fig. 2) is arranged to cooperate therewith.

Figure 4:
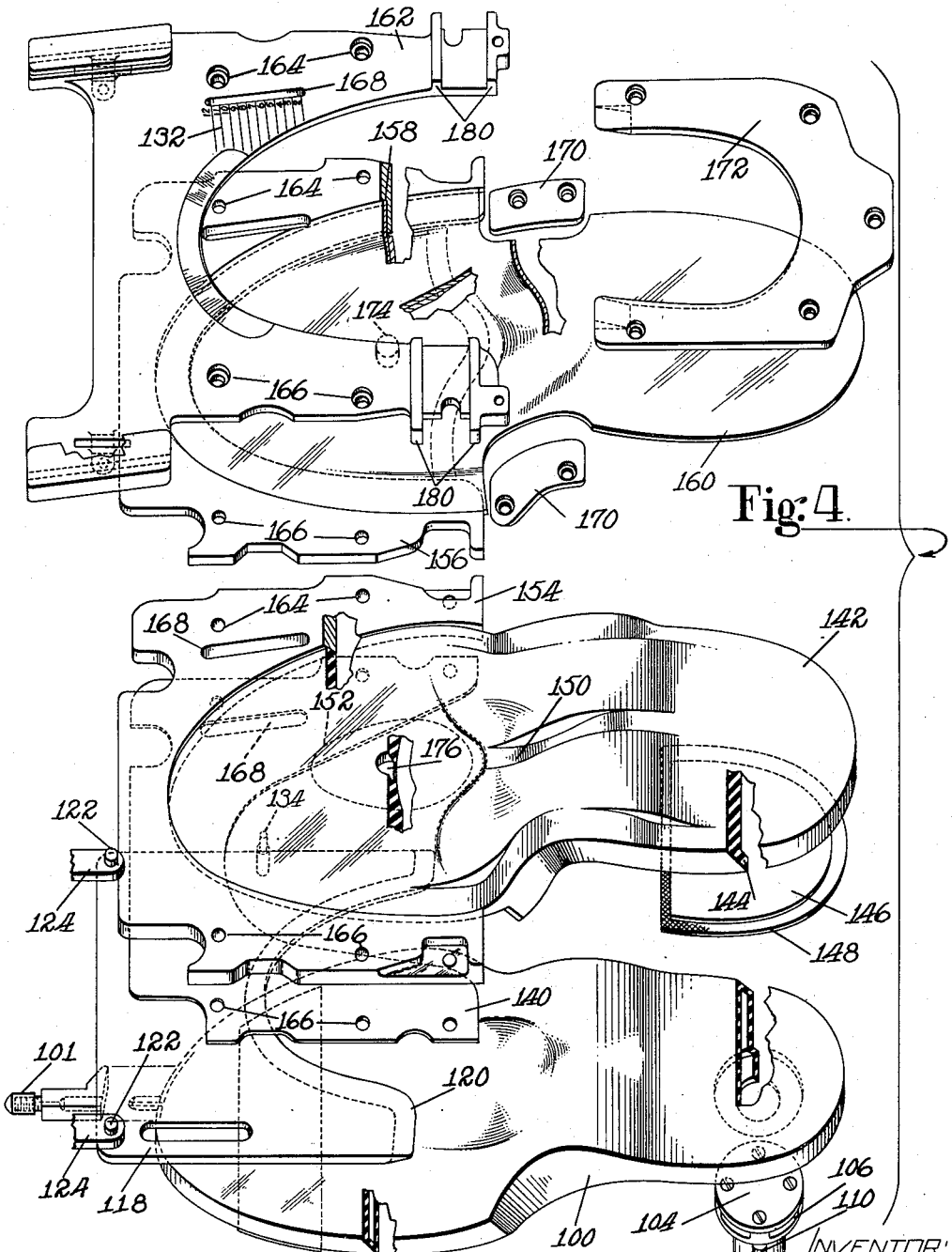
Fig. 4 is an exploded view showing the construction of the pads and mask plate used on the machine.

In the pad box are arranged the parts shown in the exploded view of Fig. 4. In the bottom of the pad box is an inflatable bag or pad 100, preferably formed of rubber and having a cavity which is thin heightwise of the pad. The inflatable bag is provided at its toe end with an air valve 101 which may be opened when the pad is being filled with water to permit the exhaust of air, and on the under side of its heel end is a suitable connection through which water or other fluid may be introduced. The connection serves, as shown in Fig. 3, to clamp the inflatable pad 100 against the rear part 48 of the pad box and comprises a head 104 located inside the pad 100 and having passages 106 about its periphery communicating with a hollow stem 108. In the side of the stem are openings 110 communicating with a passage 112 to which a hose 114 is connected. The stem 108 is drawn down to cause the head 104 to force the rubber bag surrounding the stem into contact with the heel portion 48 by a screw 116 passing through the bottom of the heel portion 48 and threaded into the lower end of the stem 108.

On top of the pad 100 is a mask plate 118 having a beveled edge 120 shaped to correspond roughly to the shape of the toe portion of a shoe and arranged for adjustment lengthwise of the pad. Pins 122 on the mask plate are connected by twisted links 124 to arms 126 upstanding from a rockshaft 128 (Fig. 12), the rockshaft having at one end a lever 130 by which the shaft may be turned to move the mask plate to various positions for different sized shoes, as indicated by a scale 132 with which a pin 134 carried by the mask plate (Figs. 4 and 7) cooperates. Unintended movement of the mask plate is prevented by a friction plug 136 carried by the lever 130 and engaging a relatively fixed surface 138, as shown in Fig. 12. The mask plate 118 (Fig. 9) engages a rabbet formed in the part 44 which is slightly deeper than the thickness of the mask plate. On top of the mask plate and secured to the forepart portion 44 is a thin plate 140 and resting on this plate is a thick solid rubber pad 142.

The purpose of the plate 140 is to support the pad 142 out of contact with the mask plate 118 so that its adjusting movements will not be obstructed. The shank-and-heel portion of the pad 142 is provided with a downturned flange 144 (Fig. 4) which, when the parts are together, embraces the shank and rear portion of the pad 100. Between the pads 100 and 142 there is at the heel end a heel plate 146 which may be held in place by a piece of rubber-coated canvas 148. The plate 146, which may be substantially rigid, is for the purpose of preventing the heel portion of the pad from conforming to the shape of the shoe bottom while permitting the application thereto of considerable pressure. The pad 142 has in the shank portion a groove 150 which relieves pressure along the central portion of the shank and causes the shank pressure to be localized at the sides of the shank. The central portion of the forepart of the pad 142 may be reduced in thickness, as shown in Fig. 4, within the area indicated by the dotted line 152. Surrounding the forepart of the pad 142 is a plate 154 of slightly greater thickness than the pad 142, as indicated in Fig. 9, and over the plate 154 is arranged a plate 156 which projects over the marginal portion of the pad 100 to hold it in place and has its upper face rabbeted at 158 to receive the marginal portion of a pad cover 160, shown in Figs. 4, 9 and 10 as having in its forepart a plurality of thicknesses, the upper thickness lying in the rabbet 158 of the plate 156. On top of the plate 156 and overlying the margin of the cover 160 is a cover plate 162 which is secured in place, along with plates 156, 154 and 140, by screws which extend through holes 164 formed at one side of each of the plates and are threaded into the pad box 44. At the opposite side the plates are secured by screws passing through similar holes 166 in all the plates. The indicator 134 on mask plate 118 extends upwardly through slots 168 formed in each of the plates 140, 154, 156 and 162 and cooperates with the scale 132 to indicate the adjusted position of the mask plate. The various layers forming the pad are held in the pad box at the shank portion by plates 170 which are secured to the shank portion 46 with their edges projecting over the pad. The heel portion of the pad is held in place by a horseshoe-shaped plate 172 which is secured to the heel portion 48 of the pad box with its edge projecting over the pad. The cover 156 may be provided with a stud 174 which is adapted to enter a hole 176 in the pad 142 whereby the pad and its cover are properly located with respect to each other.

The cover plate 162 is provided with upstanding ribs 180 between which the shoe and sole gages are mounted to slide transversely of the pad to engage the sole substantially at the ends of the ball line. Between the ribs 180 at each side of the shoe is located first a sole gage 182 and above this a shoe gage 184 (Fig. 9), the gages being independently movable. The sole gage 182 at the outer end of the ball line is connected by a ball joint 186 to an arm 188. The sole gage 182 at the inner end of the ball line is similarly connected to an arm 190. These arms are connected, as shown in Fig. 6, to the upper ends of sleeves 192 mounted in bearings 194 formed in bosses on the part 44. The sleeves 192 at their lower ends are connected respectively to segments 196, 198 which mesh with each other (Fig. 8) to produce equal and opposite movement of the sole gages 182. The shoe gages 184 are connected by ball joints 200 respectively to arms 202 and 204. The arm 202 (Figs. 6 and 8) is secured to the upper end of a shaft 206 passing through the sleeve 192 and has secured to its lower end a segment arm 208 which meshes with a similar segment arm 210 connected to a similar shaft 206 similarly mounted at the opposite side of the pad.

The sole gages 182 are urged inwardly toward the shoe by a spring 212 (Figs. 5, 7 and 8) connected at one end to a pin on the segment 198 and at the other end to a pin 216 on the forepart portion 44, the tension of the spring being at least sufficient to take up the backlash in the teeth of the segments 196, 198. The closing movement of the sole gages is controlled and their opening movement effected by a pin 218 on an extension 220 (Fig. 7), extending rearwardly with respect to the machine, of the segment 196 so that the pin is out of line with the shafts 206. The pin engages a slot 222 (Fig. 8) in a slide 224 arranged for movement longitudinally of the pad on the member 44, the slot being inclined at a small angle to the direction of movement of the slide. The slide 224 has pivoted thereto at 226 one end of a yoke-shaped link 228 the other end of which is pivoted by a pin 230 to a lever 232 (Fig. 7), said lever being fulcrumed to the base at 234 (Fig. 5) on a common center with two other levers to be described, all of said levers having pins at their upper ends such as 230 which, in the normal position of the mechanism, are in line with the pivot 76 about which the forepart portion 44 is rocked by movement of the wedge 66 so that adjustment of the forepart member about its pivot does not affect the mechanisms connected to and operated by the lever 232 and the two other levers. A link 236 is pivoted to the lever 232 between its ends by a pin 238 (Fig. 8) and extends forwardly to a point opposite the breast-line gages (Fig. 7) where it is pivoted to the upper end of an arm 240 the lower end of which is pivoted by a pin 242 (Fig. 5) to the base. As shown in Fig. 5, the arm 240 is hidden by a similar arm 244 and both these arms are engaged by a contact surface 246 on an arm 248 also pivoted at 242. The arm 248 is pivoted at 250 to an upright bar 252 (Fig. 16) downward movement of which swings the arm 248 clockwise to allow the ball gages 182 to be moved inwardly toward a sole on the pad partly by the spring 212 (Fig. 8) and principally by another tension spring 254 connected to the pin 238 at one end and at the other to an ear 256 on the arm 248 (Fig. 5). During movement of the arm 248 by downward movement of the bar 252 the spring 254 maintains the arm 240 in engagement with the contact surface 246 on the arm 248 and, through the link 236, lever 232 and link 228, moves the slide 224 forwardly, the inclined slot 222 acting on the pin 218 to swing the segment 196 counterclockwise (Fig. 8) about its center 206, thus causing the ball gages 182 to engage the sole on the pad, whereupon the contact surface 246 on the arm 248 may continue its movement, separating from the arm 240 and further tensioning the spring 254 the tension of which up to the point of separation has remained substantially constant by movement of the ear 256 with the arm 248. This insures that the gages will remain in contact with the sole, the gages being locked against separation by reason of the small inclination of the slot 222 to the direction of movement of the slide 224.

The gages for the toe end of the shoe and sole may, as illustrated, be similar to those disclosed in my Patent No. 2,262,759, granted November 18, 1941. The sole gages comprise (Fig. 7) two pairs of plates 260, 262 pivoted by pins 264 to a supporting member 266 with their free edges in alinement and adapted, by reason of the pivots 264, to rest against the cover 158 of the pad. The free edges of one pair of plates form nearly a right angle with the free edges of the other pair so that together they constitute a V-gage for engagement with the toe end of the sole. Above the sole gages is a shoe gage 268 having shoe-engaging surfaces 270 arranged at the same angle to each other as the sole gages. Both the sole-gage-carrying member 266 and the shoe gage 268 are cut away in the region where their operating edges, if extended, would meet to provide an opening 272 through which the relative position of the shoe and sole may be observed by the operator. The shoe gage 268 is secured to a slide 274 by a screw 276 passing through a transverse slot in the gage 268 and threaded into the slide. The slide 274 is arranged to be moved in ways 278 formed on the supporting member 266 by a screw 280 threaded into the slide 274 and held from longitudinal movement by a pin 281 engaging a groove between the head of the screw 280 and a collar thereon. The supporting member 266 is provided with a pair of laterally extending arms 282 which are pivoted by pins 284 to upstanding ears on a member 286 which is secured by screws 288 to a sliding plate 290, the screws 288 passing through slots 292 in the member 286, which slots are perpendicular to the longitudinal median line of the forepart of a shoe placed on the pad. The plate 290 is mounted to slide longitudinally of the shoe in suitable slots 294 formed in upward extensions 296 on each side of the forepart member 44. As best shown in Fig. 12, the slots 294, while fitting the heightwise dimension of the plate 290, are extended laterally so that the plate has substantial floating movement laterally of the pad. The plate 290 is pivotally connected by twisted links 298 to upstanding arms 300 of a yoke 302 mounted to turn freely on the shaft 128, the pivots between the links and arms being rather loose to permit the lateral movement of the plate. It will be apparent that rocking the yoke 302 on its shaft 128 will move the plate and the shoe and sole gages mounted thereon longitudinally of the pad and substantially in the direction of the longitudinal median line of the forepart of a shoe or sole resting thereon, the plate 290, however, being free to move laterally to allow the sole gages to find the sole. To thus move the toe gages, one of the arms 300 has connected thereto midway of its ends a link 304 which extends forwardly (Fig. 7) and is pivoted to a lever 306 which, like the lever 232, is fulcrumed to turn on the shaft 234. Connected to the lever 306 some distance below its upper end is a link 308 which, at its forward end, is pivoted to the arm 244 which is similar to the arm 240. A tension spring 310 is connected at its rear end to an ear on the link 308 and at its forward end to an ear 312 secured to the base, the spring tending to move the toe gages toward the shoe. Since the arm 244, like the arm 240, rests in contact with the arm 248, movement of the arm 248 by downward movement of the bar 252 will permit the spring 310 to move the toe, shoe and sole gages toward the sole. After the gages meet the sole, they will be held against it by the spring 310 while the arm 248 continues its movement.

To lock the toe gages in operative position, the cover plate 162 (Fig. 12) is slotted on its under side to receive cam levers 314 pivoted at 316 to ears projecting downwardly from the plate 162, the levers having surfaces at their upper ends which are eccentric with respect to the pivot 316 so that when rocked in a counterclockwise direction (Fig. 5) they will engage the plate 290 and lock it and, of course, the gages against movement. Each of the locking levers 314 is connected by a link 318 to the upper end of an arm 320 by a pin 321, each of said arms being pinned to the shaft 234 so that clockwise movement of one of the arms 320 will cause movement of both locking levers 314 to lock the plate 290 near each of its edges. One of the arms 320 has pivoted thereto between its ends at 322 a link 324 which at its front end is pivoted to an upright arm 326 of an angle lever pivoted at 242, the other arm 328 of which is nearly horizontal. Mounted on the arm 248 is a sleeve 330 in which is a plunger 332 extending outside of the sleeve, the plunger being backed up by a spring 334. Late in the clockwise movement of the arm 248 the plunger 332 engages the horizontal arm 328 of the angle lever and moves it yieldingly downward and thus, through the links 324, 318, actuates both locking levers 314 for the plate 290. The gages are unlocked by a tension spring 335 connected at one end to the pin 322 and at the other to a fixed pin on the frame, the spring normally holding the lever 230 against an abutment 337 with the plate 290 unlocked.

Figure 7:
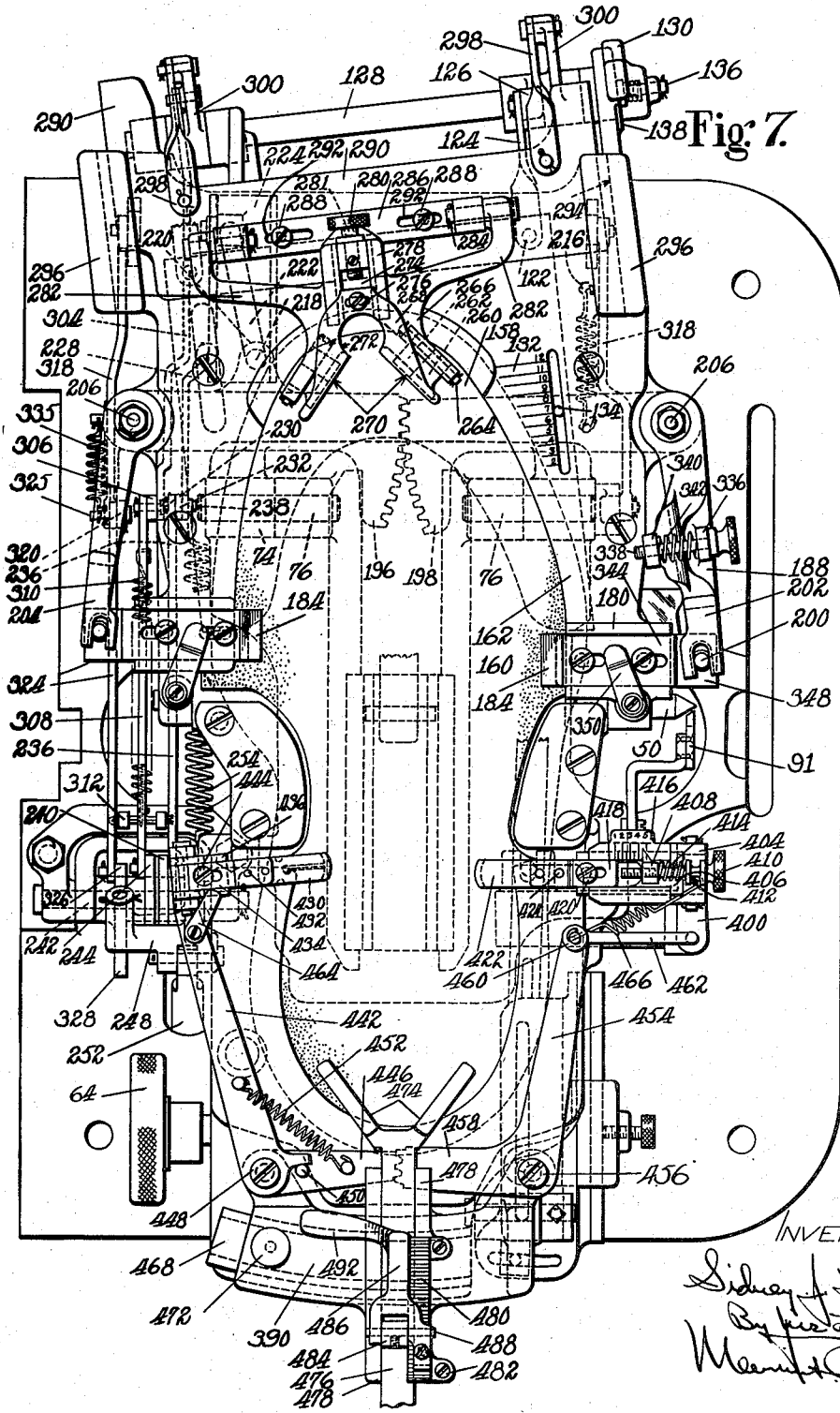
Fig. 7 is a plan view of the pad box illustrating the shoe and sole-locating mechanism.

As shown in Fig. 7, the sole gage arm 188 is provided with an upstanding lug 336 through which freely passes a thumb screw 338 which is threaded in a lug 340 on the shoe gage arm 202, a compression spring 342 being located on the screw between the lugs. This construction causes the shoe gages to be closed equally and oppositely by closing movement of the sole gages and permits adjustment of the shoe gages relatively to the sole gages to accommodate any projection of the sole beyond the shoe. Also, if the shoe gages 184 are not set at exactly the proper distance apart to receive the shoe, the spring 342 can yield to permit the shoe to be pushed down between the gages into contact with the sole and centered with respect to the sole. Further relative adjustment between the sole gages 182 and the shoe gages 184 is provided by the construction best shown in Fig. 9. The sole gage 182 extends outwardly and is connected by the ball joint 186 to the sole gage arm 188. The shoe gage 184 is connected to a plate 344 having slots therein (Fig. 7) through which pass screws 346 which are threaded into a plate 348 and provided with nuts on their lower ends. The plate 348 is connected by the ball point 200 to the shoe gage arm 202. By loosening the screws 346 the shoe gage may be adjusted relatively to the sole gage. The gages are retained in position between the ribs 180 by leaf springs 350 pivoted by screws 352 to the cover plate 162 and extending over the top of the shoe gages to press them downward yieldingly. The shoe-engaging faces of the gages 184 are upwardly and outwardly inclined to facilitate the passage of the shoe down between them and the wedging of them apart if they are set somewhat too close together.

Referring to Fig. 8, it will be seen that the gage arm 188 has a downward extension 354 on which is a fork embracing a pin 356 mounted in a slide 358 which is arranged in guides 360 (Fig. 5) formed on the under side of the forepart portion 44 of the pad box. On the inner end of the slide 358 (Fig. 8) are downwardly projecting disk-like plates 361 between which extends a rounded end of a bent bar 362 extending to the rear end of the pad box where it is provided with a pin 364 entering a slot 366 in a supporting member 368, the pin preventing movement of the bar lengthwise of the pad box but permitting its rear end to swing sidewise by reason of the slot 366. The bar 362 is provided with a slot 370.

A sliding member 372 has an edge 374 formed to engage a slot 376 formed in the upper side of the supporting member 368, the sliding member being provided with a thumb setscrew 378 to hold it in position on the supporting member 368. The sliding member 372 extends under the supporting member 368 and carries a pin 380 which extends upwardly through the slot 370 in the bar 362 and into a slot 382 formed in the supporting member 368, the pin thus providing an adjustable fulcrum for the bar 362. The member 368 has on its upper side an ear 384 (Fig. 5) which is pivoted by a pin 386 to a downwardly projecting arm 388 formed on a transverse slide 390 which carries the gages at the rear end of the shoe. Between its ends the bar 362 has an upwardly projecting pin 392 (Fig. 8) which engages a fork 394 on a slide 396 arranged to slide transversely of the shoe in ways 398 formed on the under side of the heel portion 48 of the pad box (Fig. 5).

At its outer end the slide 396 has an upward projection 400 (Fig. 8) carrying an ear 402 pivoted to downwardly projecting ears on a member 404 upon which is mounted the breast-line gage for the outer side of the sole. As best shown in Fig. 7, the member 404 is provided with suitable ways to receive a slide 406 having an upstanding ear 408 threaded to receive a thumb screw 410 which is prevented from longitudinal movement by a pin 412 located between two collars formed on the screw. Between the ear 408 and the inner collar on the screw is a spring 414 to prevent accidental turning of the screw. On one of the ways in which the slide 406 is mounted is a scale 416 with which a pointer on the ear 408 cooperates to indicate the adjustment of the slide effected by turning the screw. A member 418 is slotted to receive a screw 420 which passes through the slot and is threaded into the slide 406 and a breast-line gage 422 is riveted at 424 to the member 418. Both breast-line gages are preferably of the collapsible type disclosed in United States Letters Patent No. 2,186,961, granted January 16, 1940, in my name. It will now be seen (Fig. 8) that, when the slide 358 is moved inwardly by closing movement of the sole gage arm 188, this movement will be communicated to the lever 362 which, swinging about its fulcrum 380, will, through the pin 392, move the slide 396 carrying the breast-line gage inwardly a distance less than but proportional to the movement of the sliding member 358. Usually, since the change in widthwise dimension between successive sizes of soles at the ball line is about twice the change in widthwise dimension at the point where the breast-line gage contacts with it, the ratio of the movement of the slide 358 to that of the slide 396 will be 2 to 1 but, for other conditions, the ratio may be varied by changing the position of the fulcrum 380 which may be adjusted by loosening the thumb screw 378 and moving the fulcrum pin 380 to a different position in the slot 370. Since the slide 358 is mounted on the forepart portion 44 of the pad box and the slide 396 and the bar 370 are mounted on the heel portion 48 of the box, there will be relative movement between the slide 358 and the bar 362 when the forepart portion is adjusted up and down by movement of the wedge 66. This is provided for by the construction described in which the rounded end of the bar 362 engages what is in effect a vertical slot between the disk-like plates 361. To support the bar 362 adjacent to its rounded end it is provided with a strut 426 which rests on a stationary horizontal surface 428 formed on the base of the pad box. Preferably the bar 362 is held by a tension spring 429 in engagement with the outer one of the plates 361 so that lost motion of the bar will be prevented.

A breast-line gage 430 (Figs. 5 and 7) for the inner side of the sole is riveted at 432 to a member 434 arranged to fit between upstanding ears 436 (Fig. 5) on a member 438 which is pivoted by a pin 440 to similar upstanding ears on an arm 442. The member 434 is secured to the member 438 by a screw 444 passing through a slot (Fig. 7) in the member 434 and threaded into the member 438. The arm 442, in common with a segment arm 446, is pivoted by a screw 448 to the slide 390. The segment arm 446 carries a pin 450 which is held in abutting relation to a projection on the arm 442 by a tension spring 452 having its ends connected respectively to pins on the arm 442 and the segment arm 446. Opposite the arm 442 is a similar arm 454 on an angle lever pivoted at 456 to the slide 390, the shorter arm 458 of which is formed as a segment meshing with the segment arm 446. The end of the arm 454 is connected by a pin 460 to a link 462 the other end of which is bent downwardly (Fig. 8) to enter a vertical hole in the upward projection 400 (Figs. 7 and 8) so that movement of the slide 396 as described will impart movement to the arm 454 and, through the segment arms 458 and 446, will impart equal and opposite movement to the breast-line gage 430 on the inner side of the shoe, the inward movement of the gage 430 being rendered yielding by the spring 452. A leaf spring 464 (Fig. 7), connected at one end to the arm 442 and at the other overlying the part 436, holds the gage 430 yieldingly toward the pad. For a similar purpose a tension spring 466 is connected between the pin 412 and the pin 460 to hold the outer breast gage 422 in contact with the pad.

In most lasts the forepart is twisted about its longitudinal axis with respect to the heel part so that the side of the last bottom corresponding to the ball of the great toe is lower than the opposite side which corresponds to the little toe. This condition is recognized in the present construction in which, as shown in Fig. 12, the forepart pad box 44 and the mechanism associated therewith are laterally inclined to the supporting plate 42 at a small angle which, as illustrated, is approximately 2½ degrees. Thus, the left-hand side of the forepart of the right-hand pad box, when viewed from the operator's position, is a little lower than the opposite side and hence when pressure is applied to the shoe less distortion of the pad will result and the pressure will be more evenly distributed upon the shoe bottom. It is understood, of course, that the surface of the pad in the heel portion 48 of the pad box is laterally parallel to the supporting plate 42.

The rear end of the heel portion 48 is provided with a T-guide 468 (Fig. 5) which is curved from a center (Fig. 7) located substantially at the intersection of the median line of the heel part with the median line of the forepart of a sole placed on the pad, and the slide 390 is provided with a complementary T-way 470 engaging the T-guide, the slide being held in adjusted position on the guide by a thumb set-screw 472 threaded through the slide and engaging the T-guide 468. The slide 390 and the gages carried thereby are therefore adjustable laterally of the pad about a center located substantially at the intersection of the median line of the rear part with the median line of the forepart of a shoe and sole placed on the pad.

A V-gage 474 for the rear end of the shoe (Figs. 5 and 7) has a square stem 476 arranged to slide longitudinally of the shoe between guides 478 formed on the slide 390. The stem 476 is held in place between the guides by a toothed plate 480 secured to one of the guides by screws 482 and extending over the stem 476. On the upper side of the stem 476 is an ear 484 to which are pivoted bifurcations of a lever 486 by a pin 488. At one end of the lever, which is sustained by a spring 490, is a finger piece 492 (Fig. 5) and at the opposite end of the lever is a pawl 494 engaging the teeth of the plate 480. After a shoe has been placed upon a sole on the pad, the finger piece 492 is depressed and the V-gage 474 moved toward the shoe. When the V-gage meets the shoe, it will centralize its rear portion with respect to the sole as located by the breast-line gages 422, 430 and, upon release of the finger piece, will be held in locked position by the pawl 494. When the shoe is to be removed, the pawl is released and the V-gage moved away from the shoe by a handle 498 fixed to the rear end of the stem 476. A stop pin 500 on the lower side of the stem 476 engages the slide 390 to prevent the V-gage 474 from being pushed forwardly of the shoe beyond its guideway.

The gage-operating bar 252 is pivoted at its lower end by a pin 502 to an arm 504 (Figs. 15 and 19) which is fulcrumed on a shaft 506 supported by bearing barckets 508 projecting downwardly (Fig. 2) from a supporting partition 510 extending across the housing or frame 40. Fulcrumed on the same shaft 506 is a lever 512 to the front end of which is pivoted a rod 514 the lower end of which is connected by a pin 516 to a treadle lever 518 fulcrumed at 520 to lugs on the under side of the frame 40 and having its front end formed as a foot piece 522. The treadle lever 518 is raised by a tension spring 524 connected at its lower end to the pin 516 on the lever and at its upper end to an eye 526 on the frame. The arm 504, and consequently the bar 252, are normally held raised by a tension spring 528 connected at its lower end to the pin 502 and at its upper end to an eye 530 on the frame. Beside the arm 504 (Fig. 15) is a lever 532 fulcrumed on the shaft 506 and having its rear arm (Fig. 30) pivoted at 534 to a link 536 which at its lower end is pivoted to a piston 538 in a cylinder 540. The rear end of the lever is held down by a spring 542 connected between the rear end of the lever and a fixed point on the machine and its upward movement is adjustably limited by a screw 543 threaded into the top of the link 536, the screw engaging the partition 510. The front end of the lever 532 is bored to receive a transversely sliding bolt 544 which, as shown in Fig. 16, is bored out to receive a spring 546 one end of which engages the bottom of the bore and the other end of which engages a screw 548 threaded in the arm 532 and extending through a slot 550 in the bolt 544. The bolt 544 initially engages a ledge 552 on the lower edge of a cavity formed in the arm 504 so that downward movement of the lever 532 will carry with it the arm 504 and thus move the bar 252 downwardly to permit movement of the gages into operative position. The lever 532 is operated by oil under pressure admitted into the cylinder 540 by a valve shown in Figs. 17 and 18.

Communicating with the lower end of the cylinder is a pipe 554 having therein a septum 556 (Fig. 18). At one side of the septum 556 are ports 558 and on the other side of the septum are ports 560. Arranged to slide on the pipe 554 is a sleeve valve 562 having inside of it an annular recess 564 wide enough to cover both ports 558, 560 so that in the position shown in Fig. 18 pressure on the outside of the septum can pass through the ports 558, the annular recess 564 and the ports 560 into the cylinder 540. When the sleeve 562 is slid to the right, however, the ports 560 (Fig. 17) are opened to permit oil to be exhausted from the cylinder and the ports 558 are closed. To slide the valve from one position to the other, it is provided with an annular groove 566 which is engaged by pins 568 in the arms of a forked angle lever fulcrumed at 570 to a bracket 572 on the cylinder 540. An arm 574 of the angle lever is connected by a twisted link 576 to the rear arm of the lever 512 so that depression of the treadle 522 will move the valve from the position in Fig. 17 to its position in Fig. 18, thus admitting oil under pressure into the cylinder 540 and causing the bolt 544 to move downwardly, carrying with it the arm 504, thus depressing the bar 252 to cause operation of the gauges as described.

To hold the gages in operative position, means shown in Figs. 19 and 30 is provided for locking the bar 252 when depressed. The gage-operating bar 252 has a contact piece 578 inserted therein and held by screws 580. Upward movement of the bar 252 in response to the spring 528 is limited by engagement of a ledge 582 on the contact piece 578 with a pawl 584 pivoted by a pin 586 to a bracket 588 formed on a cylinder 590 which is secured to the supporting partition 510. A lever 592 fulcrumed on the pin 586 is held by an adjustable tension spring 594 with a surface 596 thereon in contact with the top of the cylinder 590. The lever 592 has a downward projection 598 between which and the pawl 584 is a compression spring 600 tending to turn the pawl clockwise. When the bar 252 is drawn down as described, the pawl 584 engages a notch 602 in the contact piece 578 and locks the bar in depressed position. Should the operator desire to release the gages before proceeding with the operation, the pawl 584 may be released by depressing a handle formed on a forwardly extending rod 604 which is threaded into a lug 606 on the upper side of the lever 592. When the lever 592 is thus rocked about the pivot 586, it engages an upward extension 608 on the pawl 584 and withdraws it from the notch 602, thus permitting the bar 252 to be raised by the spring 528. In the normal operation of the machine, the pawl 584 is released at the proper time by introduction of oil under pressure through a pipe 614 into the cylinder 590 in which is a plunger 616 which is raised by the oil pressure to engage the lever 592 and release the pawl 584.

The means for applying pressure to the shoe (best shown in Figs. 2 and 3) comprises a member or head 618 (Fig. 2) having thereon an abutment 620 to engage the cone of the last and an abutment 622 to engage the toe portion of the shoe. The abutment 622 is carried by a slide 624 arranged to move longitudinally of the shoe on guides 626 formed on the head. The slide 624 is connected by a link 628 to a pin 630 eccentrically mounted with respect to a shaft 632 extending through the head and provided with a hand wheel 634 so that by turning the hand wheel the slide 624 and the abutment 622 may be moved longitudinally of the shoe to locate the abutment properly with respect to shoes of different sizes. Accidental turning of the hand wheel is prevented by a compression spring 636 mounted on the shaft 632 between the hand wheel 634 and the head 618. The head 618 is pivoted at 638 at each side of the pad to a bar 640, which bars at their lower ends are pivoted at 642 to a cross head 644. The bars 640 are normally supported against depression by rolls 646 on their inner sides which engage ledges 648 on the plate 42. To bring the abutments 620, 622 into position over the shoe, the operator grasps the hand wheel 634 and swings the bars 640 about their pivots 642 until the rolls 646 on the bars engage walls 650 of grooves formed in a downwardly projecting part of the plate 42. When released, the head 618 is drawn into the position shown in Fig. 2 by tension springs 652 connected between the bars 640 and the machine frame. When in this position the rolls 646 overlie the ledges 648 which prevent the head 618 from being moved downward when in that position.

When the head is released and drawn back as described, it may be in such a position about its pivot 638 that the abutment 622 will strike the gage mechanism. To prevent this an arm 654 connected to the head 618 is pivoted to a link 656 having a slot 658 at its lower end. An angle lever pivoted at 660 to the frame has on one arm a pin 662 engaging the slot 658 and has its other arm connected by a link 664 to the bar 640. As the bar 640 is swung toward the position shown in Fig. 2, the pin 662 engages the upper end of the slot 658, pushing upwardly on the link 656, thus tipping the head 618 in a counterclockwise direction to prevent the abutment 622 from hitting the gages. The link 656 is provided with a yielding element 666 arranged to permit lengthening of the link when necessary but preventing its being shortened.

The crosshead 644 (Fig. 3) and connected mechanism, including the shoe abutments, are held raised by a pair of tension springs 668 connected at their lower ends to eyes 670 on the crosshead and at their upper ends to eyes 672 on the cover plate 42 (Fig. 2). Cylindrical bores 674 are formed in the downward projection of the plate 42 to form cylinders the longitudinal axes of which are perpendicular to the plate 42. In the cylinders are plungers 676 bearing at their lower ends on the crosshead 644. The upper ends of the cylindrical bores are closed by plugs 678 and oil under pressure is admitted above the plungers through a pipe 680 which has two branches one of which is connected to one of the cylinders and the other branch to the other cylinder, the point of connection being at 682 near the upper end of each cylinder. Between the plungers 676 is a cylindrical strut 684 the reduced lower end of which extends through the crosshead 644 and is held therein by a nut 686, being held from turning by a Woodruff key 688. The strut passes upwardly through a cylindrical bore 690 in the member in which the cylinders are formed, the strut being prevented from turning in the bore 690 by a spline 692. The upper end of the strut is provided with a groove 694 having its sides downwardly and inwardly inclined. Above the strut is a slide 696, T-shaped in cross-section, mounted in gibs 698 secured to the under side of the plate 42. The lower edge 700 of the slide is complemental to the groove 694 and is rearwardly and upwardly inclined (Fig. 2) so that it acts as a wedge between the plate 42 and the strut 684 to maintain the abutments 620, 622 in pressing engagement with the shoe after pressure has been applied to the shoe by fluid pressure on the plunger 676. To operate the slide 696, it is connected by a link 702 to a lever 704 fulcrumed at 706 and having between its ends a roll 708 resting on a plunger 710 fitted in a cylinder 712. A pipe 714 (Fig. 30) connected with the bottom of the cylinder 712 permits introduction of fluid pressure at the proper time to force the wedge rearwardly into locking relation between the strut 684 and the frame. The wedge is withdrawn when pressure thereon is released by a tension spring 716 connected at its upper end to the pin forming the axis of the roll 708 and at its lower end to an eye 718 on the partition 510.

Having operated the plungers 676 to apply pressure to the shoe and having operated the wedge 696 rigidly to maintain that pressure, it remains to inflate the pad 100 to apply pressure to the shoe bottom. For this purpose a cylinder having a double piston may be utilized similar to that disclosed in my prior Patent No. 2,301,205 referred to above. The hose 114 leading to the pad 100 is connected to the upper end of a cylinder 720 which may be of the construction shown in Fig. 25. Within the cylinder are a water piston 722 and an oil piston 724 connected by a strut 726. The part of the cylinder above the piston 722, including the pipe 114 and the bag 100, is filled with water, and oil under pressure is introduced beneath the piston 724 through a pipe 725 (Fig. 2) to force water into the pad 100. Any leakage of the water by the piston 722 is disposed of by a drip pipe 728 to prevent its passing into the oil.

Figures 31, 32:
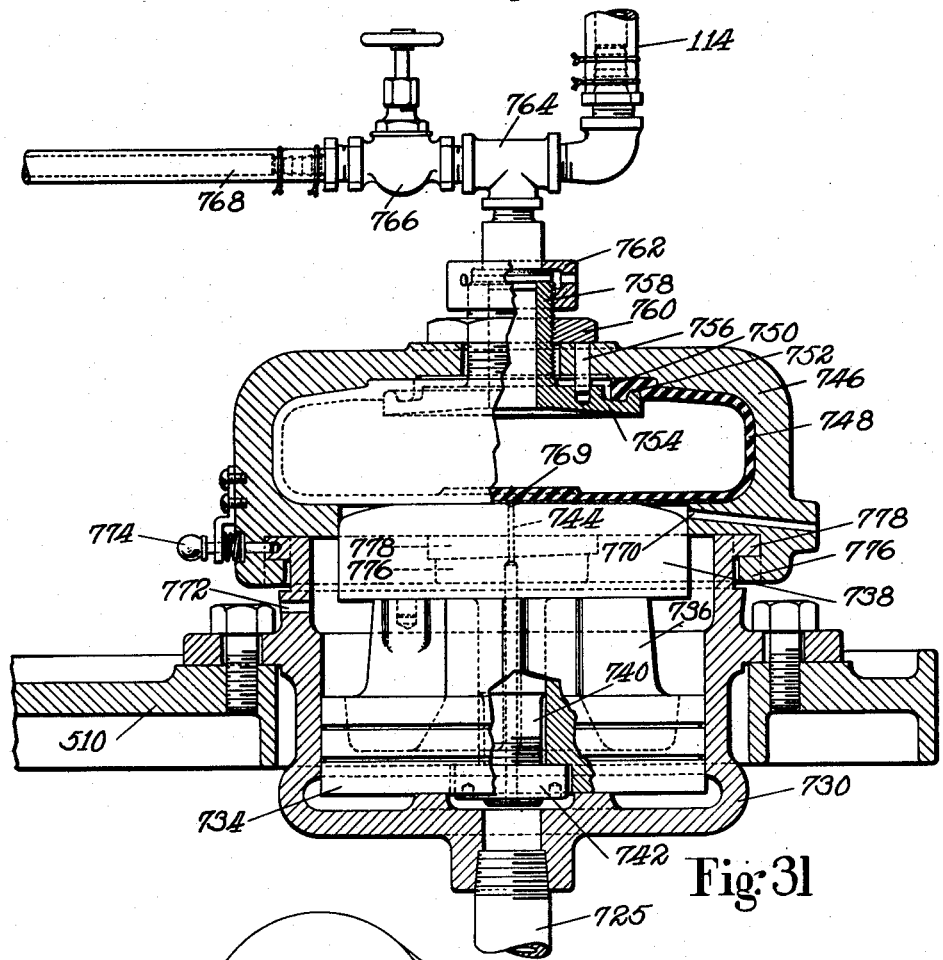
Fig. 31 is a sectional view showing a construction for use as an alternative to that shown in Fig. 25.
Fig. 32 is an elevation illustrating the manner in which power is applied to the pump and timing mechanism of the machine.

In place of the construction shown in Fig. 25 an improved construction illustrated in Fig. 31 may be employed. This construction comprises a cylindrical casing 730 connected by the pipe 725 to a source of oil under pressure and containing a piston 734 from which struts 736 project upwardly to receive a plunger 738 which is secured to the top of the struts by means of a bolt 740 which passes downwardly through the piston 734, these parts being held together by a nut 742 on the bolt. Passing longitudinally through the bolt and through the plunger 728 is a small oil duct 744. Detachably secured to the top of the cylinder 730 is a head 746 containing a bulb-like vessel 748 of rubber or similar material having an opening 750. Around the opening on the inside of the vessel is a groove 752 which receives a complementary bead on a disk 754. The disk is prevented from turning by a pin 756 anchored in the head 746 and engaging a suitable hole in the disk 754. The disk has a hollow threaded stem 758 carrying a nut 760 by which the disk may be drawn against the periphery of the opening of the vessel 748 to hold it water-tight against the head 746. The stem 758 is joined by a union 762 to a T 764 one part of which is connected to the hose 114 leading to the pad 100 and the other part of which is connected by a globe valve 766 to a hose 768 leading to a source of water supply. When oil is introduced through the pipe 725 against the piston 734, the plunger 738 is forced against the vessel 748, thus collapsing it more or less and forcing the water contained therein through the pipe 114 into the pad 100.

It has been found that the life of the vessel 748 may be greatly extended by applying a coating of material, inert to the action of oil, to the surface which engages the plunger 738 and allowing a little oil to be forced through the duct 744 to lubricate the coated surface. For example, a thin layer of chloroprene may be vulcanized to the exposed surface of the vessel as indicated at 769 in Fig. 31. Any excess of oil is allowed to drain away through a passage 770. Any leakage of oil by the piston 734 will drain out through an opening 772 when the piston 734 is raised. Should it become necessary to replace the vessel 748, the union 762 is released, a spring bolt 774 is withdrawn, and the head 746 given a partial rotation to release lugs 776 on the head from lugs 778 on the cylinder, it being understood that each of these lugs extends for only about one-eighth of the distance about the periphery of the cylinder and that, after partial rotation, the lugs 776 can pass between two of the lugs 778 to permit removal of the head. Then, by releasing the nut 760, the vessel 748 may be withdrawn and replaced by another.

As indicated in Fig. 32, power is applied to the machine from a motor 780 having two pulleys. One pulley is connected by a belt 782 to a constant delivery pump such as a gear pump 784 which draws oil through a pipe 786 from a reservoir 788 in the base of the machine (Fig. 2) and forces it under pressure through a pipe 790 to the various hydraulically operated devices in the machine. Another pulley on the motor 780 is connected by a belt 792 to a reducing gear 794 which is connected by a chain 796 to a sprocket wheel 797 on a shaft 798 which forms a part of a timing mechanism to be described.

The various hydraulically operated devices which have been described are operated in proper sequence and controlled by various valves the action of which will now be more fully described with special reference to the diagrammatic view of Fig. 30. With the motor 780 in operation, oil will be drawn by the pump 784 from a strainer 800 in the reservoir 788 in the base of the machine and delivered through the pipe 790 to a pipe 802 connected to the pipe 554 which leads to the sleeve valve 562. Passage of oil through a pipe 804 is prevented by a closed globe valve 805 and hence pressure will be built up in the pipes 554, 802 and a connected pipe 806 to an amount determined by a pressure-control valve 808 which, when a certain pressure is attained, will allow oil to pass through it. When the treadle 522 is depressed the first time, the slide valve 562 will be moved to the position shown in Fig. 18 to admit oil to the cylinder 540, causing the piston 538 to be raised and the lever 532 operated. The bolt 544 carried by the lever being at this time in position to engage a ledge 552 (Fig. 16), the arm 504 will be depressed against the tension of the spring 528 and the bar 252 drawn to permit the ball gages 182 to engage the edge face of a sole O placed on the pad substantially at the ends of the ball line, the action of the gages, since they are equally and oppositely operated, being to center the sole with respect to the pad, the movement of the ball gage on the outer side of the sole being communicated proportionally as described to the breast-line gage 422. This gage will engage the sole at the end of the breast line and move it laterally of the pad and the opposite gage 430 will be moved yieldingly toward the sole to hold it against the gage 422.

While the ball-line and breast-line gages are operating to locate the sole centrally of the pad, the toe gages are allowed to move toward the sole until the free edges of the plates 260, 262 engage the sole on opposite sides of the toe. Should the plates on one side engage the toe first, the plate 290 which carries the toe gage mechanism will move laterally until the gages contact on both sides of the toe, the toe gage thus finding the shoe in the position in which it is located by the ball and breast-line gages as described. The toe gages are locked by the cam levers 314 and the ball gages are also locked since they cannot be separated because the side pressure of the pin 218 (Fig. 8) on the inclined slot 222 in the slide 224 is ineffective to move the slide which is held forward by the tension of the spring 254.

The treadle is now released and a shoe S is placed on the sole (Fig. 11) with its toe end against the surfaces 270, the operator observing through the opening 272 whether the shoe is in proper relation to the sole. At its outer side the shoe will engage the ball-line shoe gage 184 and will engage at its inner side the opposite ball-line shoe gage which, if the gages are set too close together, can yield to permit slight separation of the ball-line gages by reason of the yielding connection between the gages provided by the spring 342. This, of course, does not affect the operation of the adjacent sole gages. The heel and V-gage 474 is released by the finger piece 492 and slid forward to engage the shoe and may be adjusted laterally if necessary by loosening the setscrew 472 and moving the slide 390 to the right or left. Since the breast-line gages are carried by the slide 390, they will be moved laterally about the same center as the slide to locate the rear portion of the sole with respect to the position of the shoe as determined by engagement therewith of the V-gage 474. The shoe and sole having been positioned properly with respect to each other, the operator seizes the hand wheel 634 and swings the head 618 over the shoe until the abutment 620 is over the cone of the last. By turning the hand wheel, he then adjusts the toe abutment 622 to suit the length of the shoe. As the side bar 640 swings forwardly with the head (Fig. 2), it engages a roll 810 carried on one arm of an angle lever pivoted at 812, the other arm of the angle lever being pivoted by a pin 813 to a rod 814 which is connected to one end of a lever fulcrumed between its ends at 816 to ears on the under side of the partition 510, the other end of the lever being connected by a link 818 to the spill-over sleeve valve shown in Fig. 24. The link 818 is pivoted to one arm of an angle lever 820 fulcrumed at 822 on a support 824 clamped to a pipe 826 on which is a sliding sleeve 828 having on its outside a groove 830 which is engaged by studs 832 in opposite arms of a yoke 834 forming the lower arm of the angle lever 820. The end of the pipe 826 is closed and in its sides is provided with ports 836 through which oil can pass freely when the valve is in the position shown. However, when the bar 640 engages the roll 810 the sleeve 828 will, through the mechanism described, be moved to the right to close the ports 836 and permit pressure to be built up in the hydraulic system. The mechanism just described serves as a safety device to prevent pressure from being applied to the shoe-pressing plungers 676 unless the shoe-supporting abutments have been moved over the shoe. Furthermore, if accidentally or otherwise the treadle should be operated to apply pressure when the abutments are over the pad but there is no shoe in the machine, the shoe abutments can be moved only a limited distance toward the pad and cannot be moved far enough to engage and damage the pad or sole-locating mechanism. To effect this, a notch 838 is made in the edge of the bar 640 which engages the roll 810 so that, after the abutments have been depressed far enough to operate upon a shoe of any size but before they reach the pad or locating mechanism, the roll 810 will drop into the notch 838, permitting a tension spring 840 connected between a point on the frame and the pivot pin 813 (Fig. 2) to shift the sleeve 828 to the left (Fig. 24) and uncover the ports 836, thus relieving the pressure on the plungers 676.

Figure 21:
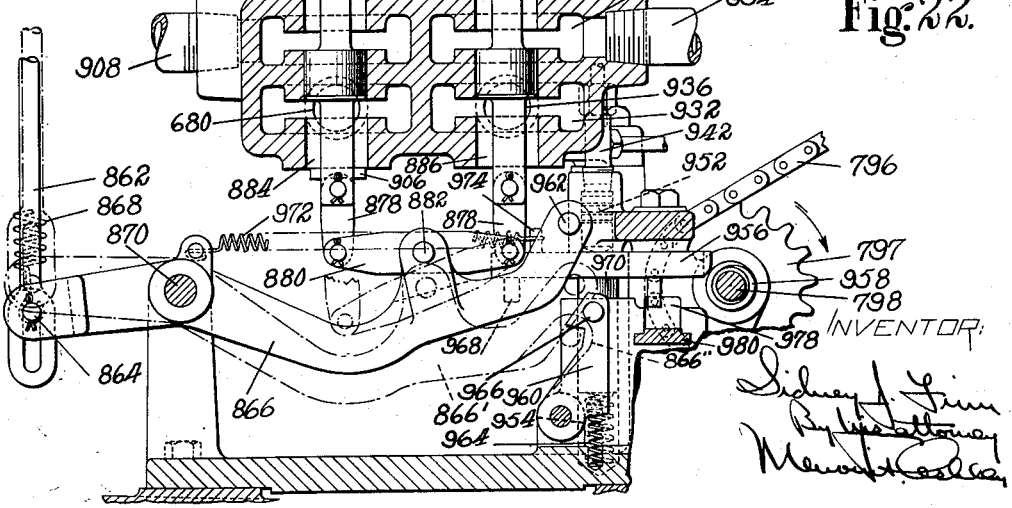
Fig. 21 is a sectional view taken on the line XXI—XXI of Fig. 20.

Upon release of the treadle 522 after its depression to cause the gages to engage the sole and become locked by the pawl 584, the treadle will rise in response to the tension of the spring 524, and the sleeve valve 562 will be shifted to exhaust the cylinder 540, whereupon, in response to the tension of the spring 542, the lever 532 will be turned clockwise (Figs. 15 and 30) causing the bolt 544 to engage an inclined surface 842 on the arm 504 and to be shifted toward the left, as shown in Fig. 13. Fulcrumed on the shaft 506 (Fig. 30) is a lever 844 which is urged in a clockwise direction by a tension spring 846 connected at its lower end to an eye in the front end of the lever and at its other end to a fixed point on the machine frame. In the side of the front arm of the lever 844 is a latch 848 (Fig. 13) which is bored to receive a compression spring 850 engaging the bottom of the bore at one end and held in place by a screw 852 at the other, the screw passing through a slot 854 in one side of the latch 848. The right-hand end of the latch 848 is beveled on its lower side and on its upper side has a recess 856 which, when the bolt 544 is shifted to the left as described, is in position to engage a lip 858 when the lever 532 is caused to move downwardly upon the next depression of the treadle. Therefore, upon the second depression of the treadle, the lever 844 will be turned counterclockwise in opposition to the spring 846. The rear end of the lever 844 is bifurcated to form ears in which is journaled a pin 860 through which is threaded a rod 862. The lower end of the rod is slotted to receive a pin 864 on a valve lever 866. A tension spring 868 is connected at one end to the pin 860 and at the other end to the pin 864. The valve lever 66 is fulcrumed at 870 to ears upstanding from a supporting member 871 secured to the bottom of the tank 788 (Fig. 2) and supporting a valve casing 872 in which are mounted two pairs of slide valves 874 and 876 (Figs. 21 and 30). A stem on the lower end of each valve of the pair is connected by a link 878 to an equalizing lever 880 which is pivoted at 882 to the lever 866.

As shown in Figs. 21 and 30, both valves are in exhaust position, exhaust ports 884 and 886 being open to permit oil to flow into the tank 788. The upper end of the valve 874 rests against a head 888 secured to the casing 872 and connected by a valve 890 to a tube 892. The valve 890 is of the type shown in Figs. 26 and 27 which permits oil to flow freely into the valve chamber and restricts its outflow. In the valve 890 is a sleeve 894 having notches in its lower end and below the sleeve is a ball 896 supported by a pin 898, the ball, during flow of oil out of the valve chamber, being forced against the end of the sleeve, causing the outflow to bleed slowly through the notches therein.

The tension of the spring 846 not only holds the valve 874 against the head 888 but also holds the valve 876 against a stop 900 and this valve is initially locked against downward movement by a latch member 902 located between the casing 872 and a projecting flange 904 on the valve. Downward movement of the valve 874 is limited by a stop 906 on the lower side of the valve casing. When now the lever 844 is operated as above described, upon the second depression of the treadle the valve lever 866 will be operated through the spring 868 until the valve 874 reaches its stop 906. Further movement of the lever 844 will then tension the spring 868, allowing the link rod 862 to rise until the lower end of the slot therein reaches the pin 864. The tension of the spring 868 is utilized further to move the lever 866 and draw the valve 876 down when the latch member 902 is withdrawn from beneath the flange 904. In Fig. 21 the dot-and-dash line 866' denotes the position of the valve lever after the valve 874 has been operated, and the dot-and-dash line 866'' indicates the final position of the lever after both valves have been operated.

Figure 20:
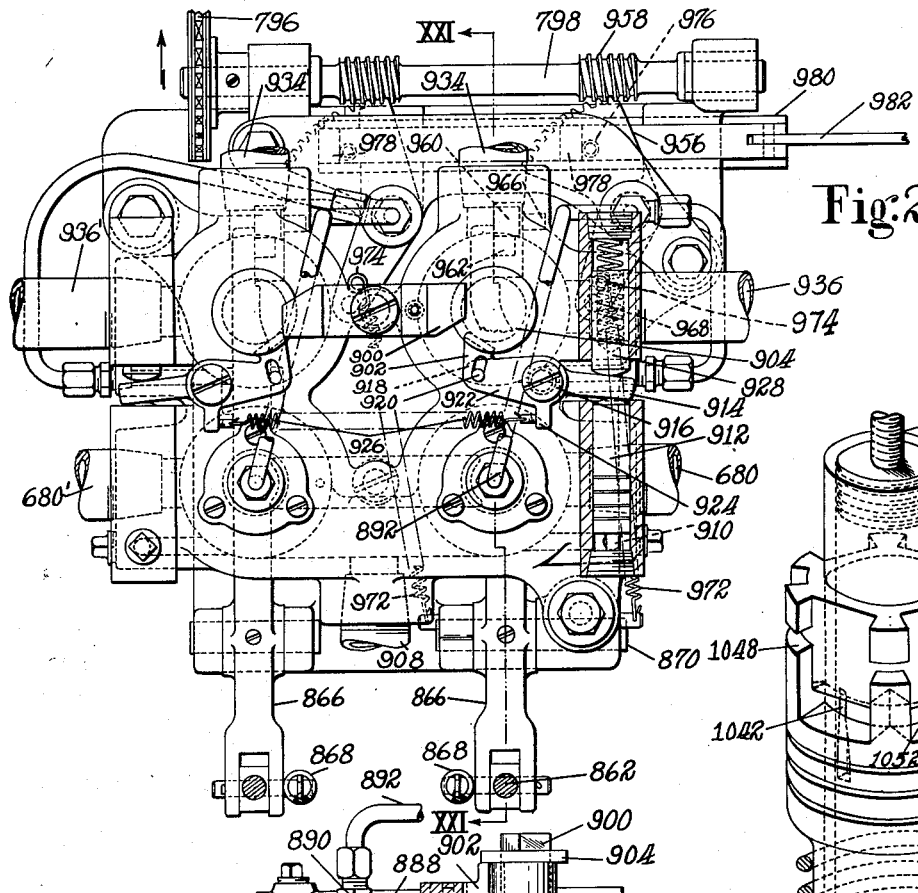
Fig. 20 is a plan view, partly in section, of the valve mechanism and the timing mechanism.

When the valve 874 has moved down as far as permitted by the stop 906, pressure fluid from a pipe 908 will pass through the valve to the pipe 680 and to the pipe 826. The slide valve 828 having now been closed by movement of the abutments over the shoe, pressure is built up in the line 680 to cause the plungers 676 to be operated to apply pressure to the shoe and in the branch pipe 614 to operate the piston 616, whereby the shoe and sole gages are released. At the same time pressure fluid is conducted through a passage 910 to act on a plunger 912 (Fig. 20) which engages an arm 914 of a lever pivoted at 916 between its ends, the other arm 918 of the lever carrying a pin 920 which extends upwardly through a slot in an arm 922 also pivoted at 916 on the end of which is formed the stop 902. The arm 922 has an offset 924 connected by a spring 926 to an offset on a similar arm associated with a similar valve on the opposite side of the casing. The fluid-operated plunger 912 is opposed by a spring-operated plunger 928. Operation of the lever 914 by the plunger 912 will move the pin 920 to retract the stop 902 to permit the valve 876 to descend and the stop will be held by the spring 926 against the flange 904 in position to lock the valve again when it is raised. Since the pin 920 on the arm 918 is located in a slot in the arm 922, the lever 914, 918 may return to its normal position even though the stop arm 922 is prevented from moving by engagement of the stop 902 with the flange 904. Upon release of the valve 876 as described the valve is drawn down by the previously tensioned spring 868, the lever 866 assuming its third position, shown at 866'' in Fig. 21.

Ports 930, 932 in the valve casing are thus connected so that pressure fluid from a pipe 934 may pass to a pipe 936 which has three branches 892, 940 and 942. The branch 892 already mentioned leads to the head 888 of the first valve and the pressure fluid enters quickly into the space above that valve, which is now open, to hold it in that position, the metering valve 890 (Fig. 27) permitting the valve 874 to return slowly to its initial position when pressure in the branch 892 is released. The branch 940 is connected to the pipes 714 and 725, the latter leading to a metering valve 944 which is similar to the valve 890 and is shown in detail in Figs. 28 and 29 where it will be seen that upward flow of fluid through the valve will lift a ball 946 to close a central passage 948 (Fig. 29), leaving small side passages 950 open to permit slow passage of the fluid. The valve 944 is in one head of the cylinder 720 by movement of the piston in which the pad 100 is inflated. Since the flow of fluid into the cylinder is restricted by the valve 944, flow takes place first through the branch pipe 714 to operate the plunger 710 by which the wedge 696 is moved into position to maintain the pressure produced by the plungers 676. After the wedge has been operated, the inflation of the pad will be completed and simultaneously flow of fluid through the branch 942 will operate a plunger 952 and will act against a spring 954 to push a segment 956 of the timing mechanism into mesh with the threaded portion 958 on the shaft 798 which is continuously driven in the manner described.

At this time the lever 866 has been locked in its lowest position by engagement of a latch 960 with a pin 962 carried by an extension of the lever. The latch 960 is urged into locking position by a spring 964 and carries a pin 966 which, after the lapse of a predetermined time, is engaged by a pin 968 (Figs. 20 and 21) carried by the segment 956, causing the latch to be moved in a direction to release the pin 962 carried by the lever 866, whereupon the valves 874, 876 are both returned to initial position by the spring 846 to cause the fluid to be exhausted from the various fluid-operated devices. However, to permit the bag 100 to be exhausted and the wedge 696 to be withdrawn before pressure on the plungers 676 is released, the return of the valve 874 is delayed by the metering valve 890 as explained and the return of the piston 724 is accelerated by the metering valve 944.

Each of the timing segments 956 (Fig. 21) has a stem 970 mounted in a bearing in the frame for rotation and for longitudinal movement and normally upheld by the spring 954 with the teeth of the segment out of mesh with the worm 958 on the shaft 798. Each segment is urged in a counterclockwise direction (Fig. 20) by a tension spring 972 connected at one end to a pin 974 on the segment and at the other end to the frame. The spring thus holds a pin 976 on the segment against an abutment 978 carried by an adjustable slide 980 the position of which determines the initial position of the segment and consequently the time required to move the segment from its initial to its latch-tripping position. The slide 980 (Fig. 23) is connected by a link 982 to the lower end of a lever 984 pivoted between its ends at 986 and having at its upper end a pair of ears through which a pin 988 extends. A threaded rod 990 having a thumb head 992 is threaded through the pin 988 and is held from longitudinal movement by a collar 994 mounted in a slot in a forked member 996 secured at 998 to a wall of the tank 788. Turning of the thumb head 992 will therefore move the slide 980 longitudinally and thus vary the initial positions of both segments 956 of the timing mechanism. When oil under pressure flows through the pipe 942 the plunger 952 above the segment will act to push its stem 970 downwardly against its supporting spring 954 and bring the teeth of the segment 956 into mesh with the constantly rotating worm 958 where it will be held until, by rotation of the segment, the pin 968 engages the pin 966, thus tripping the latch and releasing the lever 866, whereupon the pressure on the plunger 952 will be relieved and the segment 956 will be pushed upwardly by the spring 954 out of mesh with the worm 958 and then turned to its initial position by the spring 792.

It is desirable to supply oil at at least two different pressures, oil at one pressure being controlled by the valve 874 and oil at a lower pressure being controlled by the valve 876. Overflow from the pressure-control valve 808 which insures that sufficient pressure for operating the piston 538 will always be provided, passes through the pipe 908 to a pressure-control valve 1000 which determines the pressure controlled by the valve 874. The overflow of the valve 1000 is conducted by a pipe 1002 to a relief valve 1004 the overflow from which passes through a pipe 1006 to the tank. The pipe 934 leading to the valve 876 is connected to the pipe 1002 which therefore receives oil under a pressure determined by the relief valve 1004. The valves 808 and 1000 may be set to produce the same pressure, for example 100 pounds per square inch, or, if desired, the valve 808 may be set for a higher pressure and the relief valve 1004 preferably set for the lower pressure, for example seventy-five pounds per square inch. The valves 808, 1000 and 1004 may all be of constructions similar to the pressure-control valve disclosed in United States Letters Patent No. 2,047,185, granted July 14, 1936, upon application of Milton H. Ballard et al. It has been found, however, that better regulation of the pressures may be obtained when the valve 1000 is of a different type.

Figure 22:
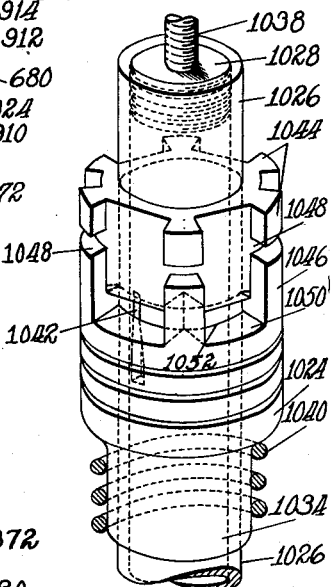
Fig. 22 is a perspective view of the operating parts of the pressure-regulating valve shown in Fig. 14.

For use in place of the valve 1000 the valve illustrated in Figs. 14 and 22 may be provided which comprises a cylindrical casing 1010 closed at one end by a cap 1012 and at the other by a screw plug 1014. Oil under pressure is introduced through an opening 1016 in the end of the casing and passes out through an opening 1018 in the side thereof. Drain passages 1020, 1022 are provided to take care of oil leakage. Mounted to have a running fit in the casing is a hollow piston 1024 in which is mounted a sleeve 1026 which extends beyond the piston at both ends and at one end is closed by a screw plug 1028, the portion extending beyond the piston at this end being guided in a bore 1030 in the casing having the same size as the sleeve. The lower end of the sleeve is guided by a skirt 1032 formed on the cap 1012. The piston 1024 has a skirt 1034 which forms an extended bearing for the piston on the sleeve as well as an extended bearing for the sleeve in the piston. Movement of the sleeve relatively to the piston is limited in one direction by engagement of an enlargement 1036 on the sleeve with the skirt 1034 of the piston and in the other direction by engagement of the enlargement with the skirt 1032 of the cap. Pressure of oil in the sleeve holds the plug 1028 in contact with a screw 1038 which is threaded through the screw plug 1014. The screw may be turned to vary the position of the sleeve with respect to the piston 1024. The piston 1024 is held at one limit of its movement by a helical compression spring 1040 located between the piston and the cap 1012. The sleeve 1026 has in its sides two slots 1042 diametrically opposed to each other which are narrow at one end and gradually widened toward the other end, the wide ends of the slots being toward the cap 1012. The top portion of the piston 1024 has the construction shown in Fig. 22 where it will be seen that the piston is formed with one series of lugs 1044 and with another series of lugs 1046, the lugs being separated by spaces 1048. The outer surfaces of the lugs are finished to the same curvature and diameter as the body of the piston so that they form guiding surfaces therefor against the inner surface of the cylindrical casing. Between each pair of lugs 1046 is a flat surface 1050 perpendicular to the axis of the sleeve 1026 and at the inner end of this surface 1050 there is formed a slot 1052 extending between two of the lugs 1046 and exposing the sleeve so that a part of the opposed slots 1042 in the sleeve will always be exposed in at least two of the slots 1052, one at one side of the piston and the other at the other side. Opposite faces of each of the lugs 1046 are inclined toward each other and meet at the inner surfaces of the piston so that if one of the slots 1042 should come opposite these surfaces a knife edge will be presented to the slot and circulation through the slot will not be substantially impeded. Circulation of oil can therefore take place from the inside of the sleeve 1026 through the slots 1042 in the sleeve, through the slots 1052 in the piston, and through the spaces 1048 to the outlet opening 1018.

In use, the inlet 1016 is connected with the pipe 908 and the outlet 1018 with the pipe 1002, the flow of oil from the constant delivery pump passing through the valve orifice provided by the overlapping slots 1042 and 1052 as above described. As will be apparent, the effective area of the valve orifice may be varied in two ways, (a) by changing the position of the sleeve 1026, and (b) by moving the piston 1024. When the several operating pistons of the machine have each been moved to operating position, the discharge from the constant delivery pump will all pass through the valve 1010 and from it through the pressure-relief valve 1004 to the tank. Under these conditions the relation between this constant quantity of liquid, the size of the orifice and the pressure in the pipes 908 and 1002 may be expressed as follows:

$$Q = ka\sqrt{p_1 - p_2}$$

Where Q is the quantity of liquid delivered by the pump in g. p. m., $k$ is a constant, $a$ is the area of the orifice, $p_1$ the upstream pressure in the line 908 and $p_2$ the downstream pressure in the line 1002. Since Q is, of course, constant, it follows that the value of the expression $a\sqrt{p_1 - p_2}$ is also a constant and that an increase in $a$ will be balanced by a decrease in the difference between $p_1$ and $p_2$. The inverse is also true, and if $a$ is decreased, then the difference between $p_1$ and $p_2$ must increase. Advantage is taken of this principle in the operation of the valve 1010 in the following manner.

With the sleeve 1026, positioned as shown and with a predetermined back pressure obtained by the setting of the relief valve 1004 in the line 1002, the piston 1024 will be shifted by the back pressure against the spring 1040 until a position of balance is reached. The upstream pressure $p_1$ will now be equal to the downstream pressure $p_2$ plus the drop across the orifice and, since this drop, that is, $p_1 - p_2$, is dependent on the size of the orifice, it follows that $p_1$ may be varied by changing the position of the sleeve 1026 by means of the screw 1038. In this way $p_1$ may be varied while $p_2$ is maintained constant.

Likewise, $p_2$ may be varied by changing the setting of the relief valve 1004 since the piston 1024 will immediately take the position in which the area of the orifice of the valve 1010 is such that the drop across it is either increased or decreased so as to maintain $p_1$ constant in accordance with the above formula.

Accordingly, within the limits of the particular design, as determined by the range of movement of the piston 1024 and the sleeve 1026, the strength of the spring 1040 and the size and shape of the slots 1042, the use of this valve 1010, together with the relief valve 1004, provides an arrangement in which the upstream pressure in the line 908 and the downstream pressure in the line 1002 can both be varied as desired.

It is to be understood that the open-ended pipes shown in Fig. 30 supply fluid under pressure for operating similar mechanism on the left-hand side of the machine, the fluid supplied by the pipe 790' being utilized to operate another piston 528 controlled by the left-hand treadle shown in Fig. 1, the pipe 908' furnishing fluid at high pressure to a valve similar to the valve 874 and the pipe 934' supplying fluid under lower pressure to a valve similar to the valve 876, check valves such as those shown at 1054 being provided in these pipes to prevent flow of fluid in the wrong direction. Water to replace leakage may be supplied to the water system by a chicken-feed device 1056 similar to that disclosed in Patent No. 2,301,205 above referred to or by suitable connection to a water main.

Having thus described my invention, what I claim as new and desire to secure by Letters Patent of the United States is:

1. In a cement sole attaching machine, the combination of a pad to receive an unattached sole, equally and oppositely movable gages to engage the edge face of the sole in the vicinity of the end of the ball line, and equally and oppositely movable gages to engage corresponding portions of a shoe placed on the sole, said shoe gages being arranged to be closed yieldingly by movement of the sole gages.

2. In a cement sole attaching machine, the combination of a pad to receive an unattached sole, equally and oppositely movable gages to engage the edge face of the sole in the vicinity of the end of the ball line, equally and oppositely movable gages to engage corresponding portions of a shoe placed on the sole, said shoe gages being arranged to be closed yieldingly by movement of the sole gages, and means for adjusting the opening between the shoe gages relatively to the opening between the sole gages.

3. In a cement sole attaching machine, the combination of a pad to receive an unattached sole, equally and oppositely movable gages to engage the edge face of the sole in the vicinity of the ball line, independently movable shoe gages mounted for equal and opposite movement to engage corresponding portions of the shoe, and a yielding connection between one of the sole gages and one of the shoe gages to allow the shoe gages to separate relatively to the sole gages.

4. In a cement sole attaching machine, the combination of a pad to receive an unattached sole, a support for the forepart of the pad, bearings at each side of the support perpendicular to the pad, upper and lower arms mounted for movement about common axes in each of said bearings, the upper arms being connected for equal and opposite movement and the lower arms being connected for equal and opposite movement, sole gages on the lower arms and shoe gages on the upper arms, means for moving the lower arms to cause the sole gages to engage the edge face of the sole, and yielding connections between one of the lower arms and one of the upper arms to close the shoe gages.

5. In a cement sole attaching machine, the combination of a pad to receive an unattached sole, equally and oppositely movable gages to engage the edge face of the sole in the vicinity of the ends of the ball line, means for locking the sole gages, and equally and oppositely movable gages to engage corresponding portions of a shoe placed on the sole, said shoe gages being arranged to be closed yieldingly by movement of the sole gages whereby a shoe may be forced between the shoe gages to effect equal and opposite separation thereof and to locate the shoe with respect to the sole held by the sole gages.

6. In a cement sole attaching machine, the combination of a pad to receive an unattached sole, equally and oppositely movable gages to engage the edge face of the sole in the vicinity of the ball line, shoe gages for locating corresponding portions of the shoe, and shoe and sole toe gages movable in the plane of the forepart of the pad to find the toe end of the sole and to assist the shoe gages at the ball line in locating the shoe.

7. In a cement sole attaching machine, the combination of a pad to receive an unattached sole, equally and oppositely movable gages to engage the edge face of the sole in the vicinity of the ball line and to locate the sole centrally with respect to the pad, a toe gage arranged for movement laterally and longitudinally of the pad to find the toe end of the sole, and means for locking the toe gage in operative position.

8. In a cement sole attaching machine, the combination of a pad to receive an unattached sole, equally and oppositely movable gages to engage the edge face of the sole in the vicinity of the ends of the ball line, breast-line gages, and means connecting the ball-line gages to the breast-line gages to cause the breast-line gages to be moved transversely of the pad toward each other for a less distance than the ball-line gages are moved.

9. In a cement sole attaching machine, the combination of a pad to receive an unattached sole, equally and oppositely movable gages to engage the edge face of the sole in the vicinity of the ends of the ball line, breast-line gages, and means connecting the ball-line gages to the breast-line gages to cause the breast-line gages to be moved transversely of the pad toward each other, the ratio of the movement of the ball-line gages to the movement of the breast-line gages being greater than unity.

10. In a cement sole attaching machine, the combination of a pad to receive an unattached sole, equally and oppositely movable gages to engage the edge face of the sole in the vicinity of the ends of the ball line, equally and oppositely movable gages to engage the edge face of the sole in the vicinity of the breast line, and means operated by movement of the ball-line gages for closing the breast-line gages.

11. In a cement sole attaching machine, the combination of a pad to receive an unattached sole, equally and oppositely movable gages to engage the edge face of the sole in the vicinity of the ball line, independently movable shoe gages mounted for equal and opposite movement to engage corresponding portions of the shoe, gages arranged for equal and opposite movement to engage the edge face of the sole in the vicinity of the breast line, and means operated by movement of the ball gages for closing the breast-line gages.

12. In a cement sole attaching machine, the combination of a pad to receive an unattached sole, equally and oppositely movable gages to engage the edge face of the sole in the vicinity of the ball line, independently movable shoe gages mounted for equal and opposite movement to engage corresponding portions of the shoe, gages arranged for equal and opposite movement to engage the edge face of the sole in the vicinity of the breast line, means operated by movement of the ball gages for closing the breast-line gages, and a V-gage movable lengthwise of the shoe to engage the rear end thereof and locate it laterally with respect to the breast-line gages.

13. In a cement sole attaching machine, the combination of a pad to receive an unattached sole, equally and oppositely movable gages to engage the edge face of the sole in the vicinity of the end of the ball line, a breast-line gage, and means connecting it to the ball-line gages to cause the breast-line gage to be moved transversely of the pad a distance proportional to the transverse movement of the ball gages.

14. In a cement sole attaching machine, the combination of a pad to receive an unattached sole, equally and oppositely movable gages to engage the edge face of the sole in the vicinity of the end of the ball line, a breast-line gage, and means connecting it to the ball-line gages to cause the breast-line gage to be moved transversely of the pad toward the sole for a less distance than the ball gages are moved.

15. In a cement sole attaching machine, the combination of a pad to receive an unattached sole, a support for the forepart of the pad, bearings at each side of the support, arms mounted in said bearings for movement about axes perpendicular to the sole-receiving face of the pad, said arms being connected for equal and opposite movement, gages for the forepart of the sole mounted on said arms, means for moving the arms to cause the sole gages to engage the edge face of the sole, a support for the rear part of the pad, breast-line gages mounted thereon, and means operated by movement of the forepart gages for moving the breast-line gages.

16. In a cement sole attaching machine, the combination of a pad to receive an unattached sole, a ball-line gage arranged for movement transversely of the pad to engage the edge face of a sole in the vicinity of the end of the ball line, a breast-line gage movable in the same direction as the ball-line gage, and means connecting the ball-line gage to the breast-line gage to cause the breast-line gage to be moved transversely of the pad a distance proportional to the transverse movement of the ball-line gage.

17. In a cement sole attaching machine, the combination of a pad to receive an unattached sole, a ball-line gage arranged for movement transversely of the pad to engage the edge face of a sole in the vicinity of the end of the ball line, a breast-line gage movable in the same direction as the ball-line gage, and means connecting the ball-line gage to the breast-line gage to cause the breast-line gage to be moved transversely of the pad a distance proportional to the transverse movement of the ball-line gage, and means for varying the proportion between the movement of the ball-line gage and the movement of the breast-line gage.

18. In a cement sole attaching machine, the combination of a pad to receive an unattached sole, a forepart gage movable transversely of the pad to engage the edge face of the sole, a support for the rear part of the pad, a rear-part gage mounted thereon for movement transversely of the pad, a pair of transverse slides one connected with the forepart gage and the other with the rear-part gage, a lever having a longitudinally extending slot, and a pin engaging said slot and adjustably carried by the rear-part support, said lever being connected to each of said slides.

19. In a cement sole attaching machine, the combination of a pad to receive an unattached sole, equally and oppositely movable gages to engage the edge face of the sole in the vicinity of the ball line, a breast-line gage, positive connections between one of the ball-line gages and the breast-line gage for causing the breast-line gage to move transversely of the sole a less distance than the ball-line gage is moved, a yielding breast-line gage acting to hold the sole against the positively moved breast-line gage, a V-gage for the toe of the sole, means for moving the toe gage longitudinally of the sole to find the toe end thereof, and means for locking the toe gage in operative position.

20. In a cement sole attaching machine, the combination of a pad to receive an unattached sole, a support for the forepart of the pad, a bearing at one side of the support, an arm mounted in said bearing for movement about an axis perpendicular to the sole-receiving face of the pad, a gage for the forepart of the sole mounted on said arm, means for moving the arm to cause the sole gage to engage the edge of the sole, a support for the rear part of the pad, a rear-part gage mounted thereon for movement transversely of the pad, a pair of transverse slides, one connected with the forepart gage and the other with the rear-part gage, and a lever fulcrumed at one end to the rear-part support, engaging the forepart slide at the other end, and connected between its ends to the rear-part slide.

21. In a cement sole attaching machine, the combination of a pad to receive an unattached sole, a support for the forepart of the pad mounted to tip on an axis transversely thereof, a gage movable over the pad to engage the forepart of a sole on the pad, a support for the rear part of the pad, a gage movable over the pad to engage the rear part of a sole on the pad, and connections for operating one of said gages in conjunction with the movement of the other gage, said connections being constructed and arranged to be undisturbed by tipping movement of the forepart support with respect to the rear-part support.

22. In a cement sole attaching machine, the combination of a pad to receive an unattached sole, a support for the forepart of the pad mounted to tip on an axis extending transversely thereof, forepart gages mounted for equal and opposite movement to engage the forepart of a sole on the pad, a fixed support for the rear part of the pad, breast-line gages movable equally and oppositely to engage the rear part of a sole on the pad, and connections for operating the breast-line gages to engage the sole in conjunction with the movement of the forepart gages, said connections being constructed and arranged to be undisturbed by tipping movement of the forepart support with respect to the heel part support.

23. In a cement sole attaching machine, the combination of a pad to receive an unattached sole, a support for the forepart of the pad mounted for movement about an axis extending transversely thereof, a slide on said support arranged for movement transversely of the pad, said slide having a depending portion provided with a vertical slot, a forepart sole gage connected for movement with said slide, a support for the rear part of the pad, a slide arranged for movement transversely thereof, and a lever fulcrumed on the rear-part support connected between its ends to the rear-part slide and having its front end engaging the vertical slot in the forepart slide.

24. In a cement sole attaching machine, the combination of a pad to receive an unattached sole, a support for the forepart of the pad mounted to tip on an axis transversely thereof, a gage movable over the pad to engage the forepart of a sole on the pad, a support for the rear part of the pad, a gage movable over the pad to engage the rear part of a sole on the pad, and connections for operating one of said gages in conjunction with the movement of the other gage, said connections including a pin and slot arranged to be undisturbed by tipping movement of the forepart support with respect to the rear-part support.

25. In a cement sole attaching machine, the combination of a pad to receive an unattached sole, a support for the forepart of the pad mounted for movement about an axis extending transversely thereof, a slide on said support arranged for movement transversely of the pad, said slide having a depending portion provided with a vertical slot, a forepart sole gage connected for movement with said slide, a support for the rear part of the pad, a slide arranged for movement transversely thereof, and a lever connected to the rear-part slide and having its front end engaging the vertical slot in the forepart slide.

26. In a cement sole attaching machine, the combination of a pad to receive an unattached sole, a support for the forepart of the pad mounted for movement about an axis extending transversely thereof, a slide on said support arranged for movement transversely of the pad, said slide having a depending portion provided with a vertical slot, a forepart sole gage connected for movement with said slide, a support for the rear part of the pad, a slide arranged for movement transversely thereof, a lever fulcrumed on the rear-part support connected to the rear-part slide and having its front end engaging the vertical slot in the forepart slide, and means for adjusting the fulcrum of the lever longitudinally thereof to vary the relative movement between the forepart slide and the rear-part slide.

27. In a cement sole attaching machine, the combination of a pad to receive an unattached sole, a support for the forepart of the pad mounted for movement about an axis extending transversely thereof, a slide on said support arranged for movement transversely of the pad, said slide having a depending portion provided with a vertical slot, a forepart sole gage connected for movement with said slide, a support for the rear part of the pad, a slide arranged for movement transversely thereof, a lever fulcrumed on the rear-part support, connected between its ends to the rear-part slide and having its front end engaging the vertical slot in the forepart slide, and means for adjusting the fulcrum of the lever longitudinally thereof to vary the relative movement between the forepart slide and the rear-part slide.

28. In a cement sole attaching machine, the combination of a pad to receive an unattached sole, means for locating the forepart of the sole centrally of the pad, V-gages for the toe of the shoe and sole, means for moving the V-gages longitudinally of the sole to find the toe end thereof, and means for locking the V-gages in operative position, said V-gages having an opening at the apex of the V to permit the operator to inspect the relative location of the shoe and sole.

29. In a cement sole attaching machine, the combination of a gage for relatively locating a shoe and sole comprising a support provided with an opening, members having converging surfaces to engage the edge face of the sole at opposite sides of the toe end portion thereof, and members having converging surfaces to engage the shoe upper at opposite sides of the toe end thereof, said converging surfaces, if extended, intersecting in said opening, said opening permitting the operator to inspect the shoe and sole to determine whether the sole and shoe are properly in contact with their respective gaging surfaces.

30. In a cement sole attaching machine, the combination of a pad to receive an unattached sole, equally and oppositely movable gages to engage the edge face of the sole in the vicinity of the ball line and locate the sole centrally with respect to the pad, equally and oppositely movable shoe gages for locating corresponding parts of the shoe with respect to the pad, a toe gage arranged for floating movement in the plane of the surface of the pad to find the toe end of the sole, and a shoe gage carried by said toe gage.

31. In a cement sole attaching machine, the combination of a pad to receive an unattached sole, means for locating the forepart of the sole on the pad, means for locating the rear part of the sole on the pad, means for locating the forepart of a shoe with respect to the sole, and a V-gage arranged to engage the rear end of the shoe, said gage being adjustable about a center located substantially at the intersection of the longitudinal median line of the forepart of the sole with the longitudinal median line of the rear part of the sole.

32. In a cement sole attaching machine, the combination of a pad to receive an unattached sole, means for locating the sole centrally of the pad, means for locating the forepart of a shoe with respect to the forepart of the sole, and a V-gage movable longitudinally of the pad to engage the rear part of the shoe, said gage being movable about a center located approximately midway of the length of the shoe.

33. In a cement sole attaching machine, the combination of a pad to receive an unattached sole, means for locating the sole centrally of the pad, means for locating the forepart of a shoe with respect to the forepart of the sole, and a V-gage movable longitudinally of the pad to engage the rear part of the shoe, said gage being movable about a center located substantially at the intersection of the median line of the forepart of the shoe with the median line of the rear part.

34. In a cement sole attaching machine, the combination of a pad, means for locating a sole centrally of the pad, means for locating the forepart of a shoe with respect to the sole, and means for engaging the rear part of the shoe to locate it with respect to the sole, said means being arranged for adjustment about a center located substantially at the intersection of the median line of the forepart of the sole with the median line of its rear part.

35. In a cement sole attaching machine, the combination of a pad to receive an unattached sole, means for locating the sole centrally of the pad, means for locating the forepart of a shoe with respect to the forepart of the sole, a V-gage movable longitudinally of the pad to engage the rear part of the shoe, said gage being movable about a center located approximately midway of the length of the shoe, and means for preventing movement of the gage away from the shoe.

36. In a cement sole attaching machine, the combination of a pad to receive an unattached sole, means for locating the sole centrally of the pad, means for locating the forepart of a shoe with respect to the forepart of the sole, a V-gage movable longitudinally of the pad to engage the rear part of the shoe, said gage being movable about a center located substantially at the intersection of the median line of the forepart of the shoe with the median line of the rear part, means for holding the gage from movement about said center, and means for holding the gage in engagement with the shoe.

37. In a cement sole attaching machine, the combination of a pad to receive an unattached sole, a support for the forepart of the pad mounted for movement about an axis extending transversely thereof, gages movable transversely and longitudinally of the pad to engage a sole located thereon, and means for operating said gages, said means including pivots normally alined with the transverse axis of the support whereby the operation of the gages is undisturbed by movement of the pad support about said axis.

38. In a cement sole attaching machine, the combination of a pad to receive an unattached sole, a support for the forepart of the pad mounted for movement about an axis extending transversely thereof to vary the longitudinal contour of the pad, gages movable transversely and longitudinally of the pad to engage a sole located thereon, means for moving the gages toward the sole on the pad, means for locking the gages in operative position, said moving and locking means including links, and levers pivoted to said links, said pivots being normally alined with the transverse axis of the support whereby the gage operating and locking mechanism is undisturbed by a movement of the pad support about said axis.

39. In a cement sole attaching machine, the combination of a pad to receive an unattached sole, a support for the forepart of the pad mounted for movement about an axis extending transversely thereof, gages movable transversely of the pad, gages movable longitudinally of the pad to engage a sole located thereon, links for operating said gages, levers pivoted to said links, the pivots of the links to the levers being normally in axial alinement with the axis of the support, and means for operating the levers to move the gages.

40. In a machine for applying pressure to shoe bottoms, an inflatable bag, a rubber pad of substantial thickness overlying the bag, and a mask plate arranged for movement longitudinally of the pad between the bag and the rubber pad.

41. In a machine for applying pressure to shoe bottoms, an inflatable bag, a rubber pad of substantial thickness overlying the bag, a mask plate arranged for movement longitudinally of the pad between the bag and the rubber pad, and externally visible means for indicating the position of the mask plate to the operator.

42. In a machine for applying pressure to shoe bottoms, an inflatable bag, a rubber pad of substantial thickness overlying the bag, a mask plate arranged for movement longitudinally of the pad between the bag and the rubber pad, and means to prevent contact of the rubber pad with the mask plate.

43. In a machine for applying pressure to shoe bottoms, a pad box, an inflatable bag in the pad box, a mask plate extending about the periphery of the forepart of the bag and arranged for movement longitudinally thereof, a plate fixed to the pad box extending over said mask plate, and a thick pad of flexible material located on said bag with its marginal portion engaging said plate, the plate serving to prevent contact between the pad and the bag.

44. In a machine for applying pressure to shoe bottoms, the combination of a pad to receive the sole of a shoe, gages movable over the pad to receive a sole placed thereon, and fluid pressure operated means for causing the gages to be moved into operative position.

45. In a machine for applying pressure to shoe bottoms, the combination of a pad to receive the sole of a shoe, gages movable over the pad to receive a sole placed thereon, and manually controlled fluid pressure operated means for causing the gages to be moved into operative position.

46. In a machine for applying pressure to shoe bottoms, the combination of a pad to receive the sole of a shoe, gages movable over the pad to engage a sole placed thereon, means tending to move the gages into operative position, means for retracting the gages, and manually controlled fluid pressure operated means for overcoming the gage-retracting means and permitting the gages to move into operative position.

47. In a machine for applying pressure to shoe bottoms, the combination of a pad to receive the sole of a shoe, gages movable equally and oppositely over the pad to engage a sole placed thereon, spring means tending constantly to move the gages into operative position, means for retracting the gages against said spring means, and manually controlled fluid pressure operated means for overcoming the gage-retracting means and permitting the gages to be moved by the spring means into operative position.

48. In a cement sole attaching machine, the combination of a pad to receive an unattached sole, gages to engage the edge face of the sole in the vicinity of the ends of the ball line, breast-line gages to engage the sole in the vicinity of the breast line, means connecting the ball-line gages to the breast-line gages to cause the breast-line gages to be moved transversely of the pad when the ball-line gages are moved, spring means acting to move the gages into inoperative position, and fluid pressure operated means for overcoming said spring means and permitting movement of the gages into operative position.

49. In a machine for applying pressure to shoe bottoms, the combination of a pad to receive the sole of a shoe, gages movable over the pad to engage a sole placed thereon, spring means tending to move the gages into operative position, stronger spring means acting to overcome said spring means and hold the gages in inoperative position, and manually controlled fluid operated means for overcoming said stronger spring means and allowing the gages to be moved into operative position.

50. In a cement sole attaching machine, the combination of a pad to receive an unattached sole, a ball-line gage, a breast-line gage, means connecting the ball line gages to the breast-line gage to cause the breast-line gage to be moved transversely of the pad when the ball-line gage is moved, spring means for holding the gages in inoperative position, and fluid pressure operated means for overcoming said spring means and permitting the gages to move into operative position.

51. In a cement sole attaching machine, the combination of a pad to receive an unattached sole, a ball-line gage arranged for movement transversely of the pad to engage the edge face of a sole in the vicinity of the end of the ball line, a breast-line gage movable in the same direction as the ball-line gage, means connecting the ball-line gage to the breast-line gage to cause the breast-line gage to be moved transversely of the pad a less distance than the ball-line gage is moved, a toe gage, means for locking said gages in operative position, and fluid operated means for unlocking the gages and moving them into an inoperative position.

52. In a machine for applying pressure to shoe bottoms, the combination of a pad, a support therefor, abutments movable into and out of position over the pad for applying pressure to a shoe placed thereon, fluid pressure operated means for operating the abutments, a supply line for furnishing fluid under pressure to said fluid operated means, a spill-over valve connected to said line, and means controlled by movement of the abutments into pressure applying position for closing said spill-over valve.

53. In a machine for applying pressure to shoe bottoms, the combination of a pad, a support therefor, shoe abutments movable into and out of position over the pad for applying pressure to a shoe placed thereon, bars carrying said abutments, fluid pressure operated means for operating said bars, a supply line for furnishing fluid under pressure to said fluid operated means, a spill-over valve connected to said line, and means actuated by contact with one of said bars when in pressure-applying position for closing said spill-over valve, said bar having a notch which, after it has moved sufficiently to apply pressure to a shoe but not far enough to reach the pad, will allow the spill-over valve to open and thus limit movement of the abutments.

54. In a machine for applying pressure to shoe bottoms, the combination of a pad, a support therefor, abutments movable into and out of position over the pad for applying pressure to a shoe thereon, bars carrying said abutments, fluid pressure operated means for moving the bars to apply pressure to the shoe, a supply line for furnishing fluid under pressure to said fluid operated means, a spill-over valve connected to said line, and means controlled by movement of the bars in a direction to apply pressure to the shoe for opening said spill-over valve.

55. In a machine for applying pressure to shoe bottoms, the combination of an inflatable pad, means for relatively locating a shoe and sole on the pad, fluid pressure operated means for applying pressure to a shoe on the pad, a source of fluid under pressure for operating said fluid operated means, fluid operated means for inflating the pad to press the sole against the shoe, fluid operated means for causing movement of the locating means away from the shoe, and means for causing said pressure source to operate first to cause the gages to be removed and then to inflate the pad.

56. In a machine for applying pressure to shoe bottoms, the combination of a pad, means for applying pressure to a shoe on the pad, a wedge for maintaining said pressure, and fluid pressure operated means for causing the wedge to operate.

57. In a machine for applying pressure to shoe bottoms, the combination of an inflatable pad, means for applying pressure to a shoe on the pad, a wedge for maintaining said pressure, means for inflating the pad to press a sole against the shoe, and means operating in advance of said inflation for operating the wedge to maintain the pressure of the shoe against the pad.

58. In a machine for applying pressure to shoe bottoms, the combination of an inflatable pad, means for applying pressure to a shoe on the pad, a wedge for maintaining said pressure, means for inflating the pad to press a sole against the shoe, a first valve for controlling the application of pressure to the shoe, a second valve for controlling inflation of the pad and the insertion of the wedge, means for locking the second valve in closed position, means for opening the first valve to apply pressure to the shoe and to store energy for operating the second valve, and means becoming operative upon opening of the first valve for unlocking the second valve, inserting the wedge and inflating the pad.

59. In a machine for applying pressure to shoe bottoms, the combination of an inflatable pad, fluid operated means for applying pressure to a shoe on the pad, a wedge for maintaining said pressure, fluid operated means for inflating the pad to press a sole against the shoe, and means for first causing pressure to be applied to the shoe, then the wedge to be inserted and thereafter the pad to be inflated.

60. In a machine for applying pressure to shoe bottoms, the combination of a pad, gages for locating the toe portion of the shoe and sole on the pad, a member constructed and arranged to swing lengthwise of the pad and to turn about a transverse axis, a toe abutment on said member, means for operating said member to apply pressure to the shoe, means acting when the pressure is relieved to swing the member toe-ward of the shoe, and other means acting to turn the member on its transverse axis to prevent the abutment carried thereby from hitting the gages.

61. In a machine for applying pressure to shoe bottoms, the combination of an inflatable pad, a flexible bulb connected with said pad and adapted to contain fluid, a head containing said bulb and arranged to expose a wall thereof, and means for applying pressure to said exposed wall.

62. In a machine for applying pressure to shoe bottoms, the combination of an inflatable pad, a flexible bulb connected with said pad and adapted to contain fluid, a head containing said bulb and arranged to expose a wall thereof, means for applying pressure to said exposed wall, said exposed wall being coated with chloroprene, and means for lubricating the means for applying pressure to the wall.

63. In a machine for applying pressure to shoe bottoms, the combination of an inflatable pad, a flexible bulb connected with said pad and adapted to contain liquid, a head containing said bulb and constructed and arranged to expose a wall thereof, and means engaging the entire exposed surface of the bulb for applying pressure to said exposed wall.

64. In a machine for applying pressure to shoe bottoms, an inflatable pad, a flexible bulb connected with the pad, the pad and the bulb being adapted to contain water, a cylinder, a fluid operated plunger therein, and a cap for the cylinder containing said bulb and exposing a part thereof to the action of said plunger, the action of the plunger on the bulb forcing water into the pad.

65. In a machine for applying pressure to shoe bottoms, a cylinder, a piston in said cylinder, means for introducing fluid under pressure into said cylinder to operate the piston, a head detachably secured to said cylinder and formed to contain a flexible vessel, a flexible vessel in said head with part of its surface exposed in said cylinder, a plunger engaging said surface and connected with said piston, an inflatable pad, and means connecting said pad and said vessel whereby water contained therein will be forced into the pad by operation of the piston.

66. In a machine for applying pressure to shoe bottoms, the combination of an inflatable pad, a flexible bulb connected with said pad and adapted to contain fluid, a head partially enclosing said bulb and exposing a wall thereof, said wall having a layer of chloroprene vulcanized thereto, an oil-operated plunger engaging said wall, and means for conducting oil to the surface of the bulb acted on by said plunger to lubricate the chloroprene surface.

67. In a machine for applying pressure to shoe bottoms, the combination of an inflatable pad, a flexible bulb connected with said pad and adapted to contain fluid, a head containing said bulb and arranged to expose a wall thereof, an oil-operated plunger engaging said wall, and means for conducting oil to the surface of the bulb acted on by the plunger.

68. In a machine for applying pressure to shoe bottoms, the combination of an inflatable pad, a flexible bulb connected with said pad and adapted to contain fluid, a head containing said bulb and arranged to expose a wall thereof, means for applying pressure to said exposed wall, an oil-operated plunger engaging said wall, means for conducting oil to the surface of the bulb acted on by the plunger, and means for rendering the exposed surface of the bulb inert to the action of the oil.

69. In a machine for applying pressure to shoe bottoms, a cylinder, a piston in said cylinder, spaced lugs on the periphery of the cylinder, a head having spaced lugs to engage those on the cylinder to detachably secure the head to the cylinder, said head being formed to contain a flexible vessel, a flexible vessel in said head with part of its surface exposed in said cylinder, a plunger engaging said surface and connected with said piston, an inflatable pad, and means connecting said pad and said vessel whereby fluid contained therein will be forced into the pad by operation of the piston.

70. In a machine for applying pressure to shoe bottoms, the combination of a pad, sole gages movable over the pad to engage a sole placed thereon, means for applying pressure to the shoe, and a single manually operated means acting upon one movement thereof to cause the gages to be brought into operative position and upon the next movement thereof to cause the gages to be withdrawn.

71. In a machine for applying pressure to shoe bottoms, the combination of a pad, sole gages movable over the pad to engage a sole placed thereon, means for applying pressure to the shoe, and a single manually operated means acting upon one movement thereof to cause the gages to be brought into operative position and upon the next movement thereof to cause pressure to be applied to the shoe and the gages to be withdrawn.

72. In a machine for applying pressure to shoe bottoms, the combination of a pad, sole gages movable over the pad to engage a sole placed thereon, shoe gages movable with the sole gages to locate a shoe with respect to the sole, means for applying pressure to the shoe, and a single manually operated means acting upon one movement thereof to cause the gages to be brought into operative position and upon the next movement thereof to cause pressure to be applied to the shoe.

73. In a machine for applying pressure to shoe bottoms, the combination of a pad, sole gages movable over the pad to engage a sole placed thereon, shoe gages movable with the sole gages to locate a shoe placed on the sole with respect to the sole, means for locking the gages, means for applying pressure to the shoe, and a single manually operated means acting upon one movement thereof to cause the gages to be brought into operative position and upon the next movement in the same direction to cause pressure to be applied to the shoe and the gages to be unlocked.

74. In a machine for applying pressure to shoe bottoms, the combination of a pad, sole gages movable over the pad to engage a sole placed thereon, shoe gages movable with the sole gages to locate a shoe with respect to the sole, means for locking the gages, means for applying pressure to the shoe, and a single treadle acting upon one depression thereof to cause the gages to be brought into operative position and upon the next depression thereof to cause pressure to be applied to the shoe and the gages to be unlocked.

75. In a machine for applying pressure to shoe bottoms, the combination of a pad, sole gages movable over the pad to engage a sole placed thereon, means for locking the gages in operative position, means for applying pressure to a shoe placed on the sole, and a single manually operated means acting upon one movement thereof to cause the gages to be brought into operative position and locked in said position and upon the next movement thereof in the same direction to cause pressure to be applied to the shoe and the gages to be unlocked.

76. In a machine for applying pressure to shoe bottoms, the combination of a pad, sole gages movable over the pad to engage a sole placed thereon, means for holding the gages in operative position, spring means for retracting the gages, means for applying pressure to a shoe placed on the sole, and a single treadle acting upon one depression thereof to cause the gages to be brought into operative position and upon the next depression thereof to cause pressure to be applied to the shoe and the gages to be released.

77. In a machine for applying pressure to shoe bottoms, the combination of a pad, sole gages movable over the pad to engage a sole placed thereon, shoe gages for locating a shoe with respect to the sole, spring means for retracting the gages, a latch for holding the gages in operative position, fluid pressure operated means for causing the gages to move into operative position, fluid pressure operated means for applying pressure to the shoe, fluid pressure operated means for releasing the latch, and a single control means acting upon one movement thereof to cause operation of the fluid pressure operated means for causing movement of the gages into operative position and upon the next movement thereof in the same direction for causing operation of the fluid pressure operated means for applying pressure to the shoe and of the fluid pressure operated means for releasing the gages.

78. In a machine for applying pressure to shoe bottoms, the combination of an inflatable pad, fluid operated means for applying pressure to a shoe on the pad, means for inflating the pad to press a sole against the shoe, a first valve for controlling the supply of fluid to said fluid pressure operated means, a second valve for controlling inflation of the pad, an equalizing lever connecting the valves, an operating lever connected to the equalizing lever, means for locking the second valve closed, means for operating the lever to open the first valve and store energy for operating the second valve, means operative on opening of the first valve for unlocking the second valve, and means operated by opening of the second valve for holding the first valve open.

79. In a machine for applying pressure to shoe bottoms, the combination of an inflatable pad, fluid pressure operated means for applying pressure to a shoe on the pad, means for inflating the pad to press a sole against the shoe, a first valve for controlling the supply of fluid to said fluid pressure operated means, a second valve for controlling inflation of the pad, an equalizing lever connecting the valves, an operating lever connected to the equalizing lever, means for locking the second valve closed, fluid pressure operated means for moving the operating lever to open the first valve and to store energy for operating the second valve, means operative on opening of the first valve for unlocking the second valve, and means operated by opening of the second valve for holding the first valve open.

80. In a machine for applying pressure to shoe bottoms, the combination of an inflatable pad, fluid pressure operated means for applying pressure to a shoe on the pad, means for inflating the pad to press a sole against the shoe, a first valve for controlling the supply of fluid to said fluid operated means, a second valve for controlling inflation of the pad, an equalizing lever connecting the valves, an operating lever connected to the equalizing lever, means for locking the second valve closed, means for operating the last-mentioned lever to open the first valve and to store energy for operating the second valve, fluid pressure means operative on opening of the first valve for unlocking the second valve, and means operated by opening of the second valve for holding the first valve open.

81. In a machine for applying pressure to shoe bottoms, the combination of an inflatable pad, fluid pressure operated means for applying pressure to a shoe on the pad, means for inflating the pad to press a sole against the shoe, a first valve for controlling the supply of fluid to said fluid pressure operated means, a second valve for controlling inflation of the pad, an equalizing lever connecting the valves, an operating lever connected to the equalizing lever, means for locking the second valve closed, means for operating the last-mentioned lever to open the first valve and store energy for operating the second valve, means operative on opening of the first valve for unlocking the second valve, and fluid pressure operated means becoming effective on opening of the second valve for holding the first valve open.

82. In a machine for applying pressure to shoe bottoms, the combination of an inflatable pad, fluid operated means for applying pressure to a shoe on the pad, fluid pressure operated means for inflating the pad to press the sole against the shoe, a pair of slide valves one for controlling the application of pressure to the shoe and the other for controlling the inflation of the pad, an equalizing lever connected to the valves, an operating lever connected to the equalizing lever, means for locking the inflation-controlling valve in closed position, spring means, and means operating through said spring means to move the lever to open the valve for controlling the application of pressure to the shoe and to store energy for operating the other valve, means becoming operative upon opening of the pressure-applying valve for unlocking the inflation-controlling valve, and means operated by opening of the inflation-controlling valve for holding the pressure-controlling valve open.

83. In a machine for applying pressure to shoe bottoms, the combination of an inflatable pad, means for applying pressure to a shoe on the pad, means for inflating the pad to press a sole against the shoe, a valve for controlling application of pressure to the shoe, a valve for controlling inflation of the pad, an equalizing lever connecting the two valves, an operating lever connected to the equalizing lever, means for locking the inflation-controlling valve in closed position, means for operating the lever to open the valve for controlling the application of pressure to the shoe and to store energy for operating the other valve, means becoming operative upon opening of the pressure-applying valve for unlocking the inflation-controlling valve and causing it to be opened by said stored energy, and means becoming operative upon opening of the inflation-controlling valve for locking the pressure-controlling valve in open position.

84. In a machine for applying pressure to shoe bottoms, the combination of an inflatable pad, means for applying pressure to a shoe on the pad, means for inflating the pad to press a sole against the shoe, a valve for controlling application of pressure to the shoe, a valve for controlling inflation of the pad, an equalizing lever connecting the two valves, an operating lever connected to the equalizing lever, means for locking the inflation-controlling valve in closed position, means for operating the lever to open the valve for controlling the application of pressure to the shoe and to store energy for operating the other valve, means for locking the operating lever, means becoming operative upon opening of the pressure-applying valve for unlocking the inflation-controlling valve and causing it to be opened by said stored energy, means becoming operative upon opening of the inflation-controlling valve for locking the pressure-controlling valve in open position, timing means set in operation by opening of the inflation-controlling valve for releasing the operating lever after a predetermined time has elapsed, and means for restoring the valves to initial position.

85. In a machine for applying pressure to shoe bottoms, the combination of an inflatable pad, a support therefor, abutments movable into and out of position over the pad, fluid pressure operated means for moving the abutments to apply pressure to a shoe placed on the pad, a source of fluid under pressure, a first valve for controlling the supply of pressure fluid to said fluid pressure operated means, a second valve for controlling the supply of pressure fluid to said inflatable pad, a valve-operating lever connected to said valves, means for locking the second valve closed, fluid pressure operated means including a spring for opening the first valve and storing energy in the spring for operating the second valve, fluid pressure operated means controlled by said first valve for unlocking the second valve, and connections from said fluid pressure supply to hold said first valve open.

86. In a machine for applying pressure to shoe bottoms, the combination of an inflatable pad, a support therefor, abutments movable into and out of position over the pad, fluid pressure operated means for moving the abutments to apply pressure to a shoe placed on the pad, a wedge movable between said support and said first pressure operated means to maintain the pressure produced thereby, a source of fluid under pressure, a first valve for controlling the supply of pressure fluid to said fluid pressure operated means, a second valve for controlling the supply of pressure fluid to said inflatable pad, a valve-operating lever connected to said valves, means for locking the second valve closed, fluid pressure operated means including a spring for opening the first valve and storing energy in the spring for operating the second valve, fluid pressure operated means controlled by said first valve for unlocking the second valve, fluid pressure operated means controlled by the opening of said second valve for inserting said wedge, and connections from said fluid pressure supply to hold said first valve open.

87. In a machine for applying pressure to shoe bottoms, the combination of an inflatable pad, a support therefor, abutments movable into and out of position over the pad, fluid pressure operated means for operating the abutments to apply pressure to a shoe placed on the pad, a wedge movable between said support and said fluid pressure operated means to maintain the pressure produced thereby, a source of fluid under pressure, a first valve for controlling the supply of pressure fluid to said fluid pressure operated means, a second valve for controlling the supply of pressure fluid to said inflatable pad, a valve-operating lever connected to said valves, means for locking the second valve closed, fluid pressure operated means including a spring for opening the first valve and storing energy in the spring for opening the second valve, fluid pressure operated means controlled by said first valve for unlocking the second valve, fluid pressure operated means controlled by the opening of said second valve for inserting said wedge, connections from said fluid pressure supply to hold said first valve open, a latch for holding the valve-operating lever in the position it assumes when both valves are open, means for releasing the latch after a predetermined time, and mechanism operated by opening of said second valve for setting said timing mechanism in operation.

88. In a machine for applying pressure to shoe bottoms, the combination of an inflatable pad, a support therefor, abutments movable into and out of position over the pad, fluid operated means for operating the abutments to apply pressure to a shoe placed on the pad, a wedge movable between said support and said fluid operated means to maintain the pressure produced thereby, a source of fluid under high pressure, a source of fluid under lower pressure, a first valve for controlling the supply of high-pressure fluid to said fluid operated means, a second valve for controlling the supply of lower pressure fluid to said inflatable pad, a valve-operating lever connected to said valves, means for locking the second valve closed, fluid pressure operated means including a spring for opening the first valve and storing energy in the spring for operating the second valve, fluid pressure operated means controlled by said first valve for unlocking the second valve, fluid pressure operated means controlled by the opening of said second valve for inserting said wedge, and connections from said lower pressure fluid supply to hold said first valve open.

89. In a machine for applying pressure to shoe bottoms, the combination of an inflatable pad, a support therefor, abutments movable into and out of position over the pad, fluid operated means for operating the abutments to apply pressure to a shoe placed on the pad, a wedge movable between said support and said fluid operated means to maintain the pressure produced thereby, a source of fluid under high pressure, a source of fluid under lower pressure, a first valve for controlling the supply of high-pressure fluid to said fluid operated means, a second valve for controlling the supply of lower pressure fluid to said inflatable pad, a valve-operating lever connected to said valves, means for locking the second valve closed, fluid pressure operated means including a spring for opening the first valve and storing energy in the spring for operating the second valve, fluid pressure means controlled by said first valve for unlocking the second valve, fluid pressure operated means controlled by the opening of said second valve for inserting said wedge, connections from said fluid lower pressure supply to hold said first valve open, a latch for holding the valve-operating lever in the position it assumes when both valves are open, mechanism for releasing the latch after a predetermined time, and means operated upon opening of said second valve for setting said timing mechanism in operation.

90. In a cement sole attaching machine, the combination of a pad to receive an unattached sole, equally and oppositely movable gages to engage the edge face of the sole in the vicinity of the ends of the ball line, equally and oppositely movable gages to engage the edge face of the sole in the vicinity of the breast line, and a V-gage arranged for movement over the pad to find the toe end of the sole in the position determined by the ball-line and breast-line gages.

91. In a cement sole attaching machine, the combination of a pad to receive an unattached sole, equally and oppositely movable gages to engage the edge face of the sole in the vicinity of the ends of the ball line, a shoe gage for locating a corresponding portion of the shoe, and shoe and sole gages movable in the plane of the forepart of the pad to find the toe ends of the sole and shoe and to assist the shoe gage at the ball line in locating the forepart of the shoe.

92. In a cement sole attaching machine, the combination of a pad to receive an unattached sole, equally and oppositely movable gages to engage the edge face of the sole in the vicinity of the ends of the ball line and to locate the sole centrally of the pad, equally and oppositely movable sole gages for engaging the sole in the vicinity of the ends of the breast line, a toe gage arranged for floating movement in the plane of the surface of the pad to find the toe end of the sole, and a shoe gage carried by said toe gage.

93. In a cement sole attaching machine, the combination of a pad to receive an unattached sole, means for locating the forepart of the sole centrally of the pad, means for finding the toe end of the sole so located, shoe-locating means carried by the means for finding the toe end of the sole, equally and oppositely movable gages for the rear end of the sole, and means for locating the shoe with respect to the rear end gages.

94. In a cement sole attaching machine, the combination of a pad to receive an unattached sole, means for locating the forepart of the sole centrally of the pad, means for finding the toe end of the sole so located, shoe-locating means carried by the means for finding the toe end of the sole, equally and oppositely movable gages for the rear end of the sole, and means for locating the shoe with respect to the rear end gages, said rear end gages for the sole and shoe being arranged for movement transversely of the rear end of the pad.

95. In a cement sole attaching machine, the combination of a pad to receive an unattached sole, a ball-line gage arranged for movement transversely of the pad to engage the edge face of the sole in the vicinity of the end of the ball line, a toe gage arranged for floating movement in the plane of the surface of the pad to find the toe end of the sole, a shoe gage carried by said toe gage, a breast-line gage movable transversely of the pad to engage the sole, and means for locating the rear portion of a shoe with respect to said breast-line gage.

96. In a cement sole attaching machine, the combination of a pad to receive an unattached sole, ball-line gages arranged for movement transversely of the pad to engage the edge face of the sole in the vicinity of the ends of the ball line, a toe gage arranged for floating movement in the plane of the surface of the pad to find the toe end of the sole, a sole gage carried by said toe gage, breast-line gages movable transversely of the pad to engage the sole in the vicinity of the breast line, and means for locating the rear end of a shoe with respect to the sole held by the breast-line gages.

97. In a cement sole attaching machine, the combination of a pad to receive an unattached sole, ball-line gages arranged for equal and opposite movement to engage the edge face of the sole in the vicinity of the ends of the ball line, a toe gage arranged for floating movement in the plane of the surface of the pad to find the toe end of the sole, a shoe gage carried by said toe gage, means for locking said gages in operative position, and fluid-operated means for unlocking the gages.

98. In a cement sole attaching machine, the combination of a pad to receive an unattached sole, equally and oppositely movable gages to engage the edge face of the sole in the vicinity of the ends of the ball line, equally and oppositely movable gages to engage the edge face of the sole in the vicinity of the breast line, a V-gage arranged for movement over the pad to find the toe end of the sole in the position determined by the ball-line and breast-line gages, and means for positioning a shoe with respect to a sole held by said sole gages.

99. In a cement sole attaching machine, the combination of a pad to receive an unattached sole, equally and oppositely movable gages to engage the edge face of the sole in the vicinity of the ends of the ball line, a shoe gage for locating a shoe at the end of the ball line, and V-gages for the shoe and sole movable in the plane of the forepart of the pad to find the toe ends of the sole and shoe and to assist the shoe gage at the ball line in locating the forepart of the shoe.

100. In a cement sole attaching machine, the combination of a pad to receive an unattached sole, equally and oppositely movable gages to engage the edge face of the sole in the vicinity of the ends of the ball line and to locate the sole centrally of the pad, equally and oppositely movable sole gages for engaging the sole in the vicinity of the ends of the breast line, a V-gage for the toe arranged for floating movement in the plane of the surface of the pad to find the toe end of the sole, and a V-gage for the shoe carried by said toe gage.

101. In a cement sole attaching machine, the combination of a pad to receive an unattached sole, means for locating the forepart of the sole centrally of the pad, gages for finding the toe end of the sole so located, shoe-locating means carried by said gages, equally and oppositely movable gages for the rear end of the sole, and means movable laterally of the pad for locating the shoe with respect to the rear end gages.

102. In a cement sole attaching machine, the combination of a pad to receive an unattached sole, means for locating the forepart of the sole on the pad, a V-gage for finding the toe end of the sole so located, shoe-locating means carried by the said V-gage, equally and oppositely movable gages for the rear end of the sole, and means for locating the shoe with respect to the rear end gages, said rear end gages for the sole and shoe being arranged for movement transversely of the rear end of the pad.

103. In a cement sole attaching machine, the combination of a pad to receive an unattached sole, ball-line gages arranged for equal and opposite movement transversely of the pad to engage the edge face of the sole in the vicinity of the ends of the ball line, a shoe gage associated with one of the ball-line gages, a V-gage for the toe arranged for floating movement in the plane of the surface of the pad to find the toe end of the sole, a shoe V-gage carried by said toe gage, breast-line gages movable equally and oppositely transversely of the pad to engage the sole, and means for locating the rear portion of a shoe with respect to said breast-line gages.

104. In a cement sole attaching machine, the combination of a pad to receive an unattached sole, ball-line gages arranged for equal and opposite movement transversely of the pad to engage the edge face of the sole in the vicinity of the ends of the ball line to locate the forepart of the sole centrally of the pad, a toe gage arranged for floating movement in the plane of the surface of the pad to find the toe end of the sole, a V-gage for the shoe carried by said toe gage, breast-line gages movable transversely of the pad to engage the sole in the vicinity of the breast line, and means for locating the rear portion of a shoe with respect to the rear end of the sole held by the breast-line gages.

105. In a cement sole attaching machine, the combination of a pad to receive an unattached sole, ball-line gages arranged for equal and opposite movement to engage the edge face of the sole in the vicinity of the ends of the ball line, a V-gage for the toe arranged for floating movement in the plane of the surface of the pad to find the toe end of the sole, a V-gage for the shoe carried by said toe gage, means for locking said gages in operative position, and means for locating the rear end of the sole with respect to the rear end of the shoe.

106. In a cement sole attaching machine, the combination of a pad to receive an unattached sole, means for locating the forepart of the sole centrally of the pad, gages for finding the toe end of the sole so located, shoe-locating means carried by said gages, means for locating the rear part of the sole, means for engaging the rear part of the shoe to position it with respect to the rear part of the sole, and means whereby the means for engaging the rear part of the sole and the rear part of the shoe may be shifted bodily widthwise of the pad.

SIDNEY J. FINN.

CERTIFICATE OF CORRECTION.

Patent No. 2,356,756. August 29, 1944.

SIDNEY J. FINN

It is hereby certified that error appears in the printed specification of the above numbered patent requiring correction as follows: Page 5, first column, line 22, for "lever 230" read --lever 320--; line 49, for "ball point" read --ball joint--; page 9, second column, line 53, for "66 is" read --866 is--; page 19, first column, line 14, for "maving" read --moving--; line 16, for "first" read --fluid--; and that the said Letters Patent should be read with this correction therein that the same may conform to the record of the case in the Patent Office.

Signed and sealed this 7th day of November, A. D. 1944.

(Seal)

Leslie Frazer

Acting Commissioner of Patents.